(12) United States Patent
Koreeda et al.

(10) Patent No.: US 7,839,751 B2
(45) Date of Patent: Nov. 23, 2010

(54) OBJECTIVE LENS AND OPTICAL SYSTEM FOR OPTICAL PICK-UP

(75) Inventors: Daisuke Koreeda, Saitama-ken (JP); Koichi Maruyama, Tokyo (JP); Shuichi Takeuchi, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 1174 days.

(21) Appl. No.: 11/352,324

(22) Filed: Feb. 13, 2006

(65) Prior Publication Data

US 2006/0181978 A1 Aug. 17, 2006

(30) Foreign Application Priority Data

Feb. 14, 2005 (JP) ............................. 2005-036315

(51) Int. Cl.
*G11B 7/00* (2006.01)
*G11B 7/135* (2006.01)

(52) U.S. Cl. .............................. 369/112.07; 369/112.08

(58) Field of Classification Search ............ 369/112.05, 369/112.06, 112.11, 112.12, 112.03, 112.04, 369/112.07, 112.1, 112.15, 112.08, 112.13
See application file for complete search history.

(56) References Cited

U.S. PATENT DOCUMENTS

| | | | |
|---|---|---|---|
| 6,449,095 B1 | 9/2002 | Ohtaki et al. | |
| 6,952,390 B2 * | 10/2005 | Mimori | 369/112.07 |
| 2002/0114257 A1 * | 8/2002 | Sakai | 369/112.12 |

(Continued)

FOREIGN PATENT DOCUMENTS

JP 9-054973 2/1997

(Continued)

OTHER PUBLICATIONS

English Language Abstract of JP 2001-093179, date: 2001.

(Continued)

*Primary Examiner*—William J Klimowicz
*Assistant Examiner*—Emily Frank
(74) *Attorney, Agent, or Firm*—Greenblum & Bernstein, P.L.C.

(57) ABSTRACT

An optical system of an optical pick-up is provided. The optical system includes an optical element including at least a phase shift surface among the surfaces thereof, and located closer to a light source than the objective lens. In this configuration, $t1 \leq t2$ is satisfied, where t1 represents a thickness of a cover layer of a first optical disc for which a first laser beam is employed, and t2 a thickness of a cover layer of a second optical disc for which a second laser beam, having a longer wavelength than the first laser beam, is employed. $NA1 \geq NA2$ is satisfied, where NA1 represents a numerical aperture for the first optical disc, and NA2 the numerical aperture for the second optical disc. The phase shift surface includes a first region that converges the first laser beam on a recording surface of the first optical disc, and the second laser beam on a recording surface of the second optical disc. The first region includes at least an annular zone structure having an annular zone group including a step that gives an additional optical path length to the first laser beam generally by two wavelengths, with respect to an inner refracting surface at a boundary between adjacent refracting surfaces, and a return step portion located at an outer position of the annular zone group.

19 Claims, 10 Drawing Sheets

U.S. PATENT DOCUMENTS

| | | | |
|---|---|---|---|
| 2003/0227858 A1 | 12/2003 | Komma | |
| 2004/0257959 A1* | 12/2004 | Arai et al. | 369/112.05 |
| 2005/0002118 A1 | 1/2005 | Maruyama et al. | |
| 2005/0007932 A1* | 1/2005 | Ishika | 369/112.05 |
| 2005/0025028 A1* | 2/2005 | Hirai et al. | 369/112.05 |
| 2005/0057811 A1 | 3/2005 | Koreeda et al. | |
| 2005/0157623 A1* | 7/2005 | Itonaga | 369/112.05 |
| 2005/0180295 A1* | 8/2005 | Mimori | 369/112.07 |
| 2005/0237900 A1* | 10/2005 | Sano et al. | 369/112.08 |
| 2005/0281173 A1 | 12/2005 | Koreeda et al. | |

FOREIGN PATENT DOCUMENTS

| | | |
|---|---|---|
| JP | 2000-182265 | 6/2000 |
| JP | 2001-051192 | 2/2001 |
| JP | 2001-093179 | 4/2001 |
| JP | 2004-71134 | 3/2004 |
| JP | 2004-310976 | 11/2004 |
| JP | 2005-032411 | 2/2006 |

OTHER PUBLICATIONS

English Language Abstract of JP 9-054973, date: 1997.

* cited by examiner

OBJECTIVE LENS AND OPTICAL SYSTEM FOR OPTICAL PICK-UP

BACKGROUND OF THE INVENTION

The present invention relates to an optical pickup device that records data on and/or reproduces data from a plurality of types of optical discs of different recording densities, and to an objective lens for use with the optical pickup device.

With respect to the optical disc, a plurality of standards have been specified based on different recording densities. For example, optical discs according to new standards such as BD (Blu-ray Disc) and HD-DVD, recently put to practical use with a further increased storage capacity of information, are granted with an even higher recording density than the DVD (Digital Versatile Disc), which is one of the optical discs having a highest recording density among those commercially available. Accordingly, in order to secure the compatibility of an optical information recording and reproducing apparatus with the optical discs of different standards, the apparatus has to be able to change the numerical aperture (NA) of the light used for recording or reproducing the information, thus to obtain beam spots corresponding to different recording densities.

More specifically, for recording or reproducing information on or from the optical disc of the new standard, an optical system having a higher NA than a DVD-exclusive optical system has to be employed, so as to make the beam spot finer. Since the spot diameter can be diminished as the wavelength becomes shorter, the optical system that handles the optical disc according to the new standard has to be equipped with a laser source capable of generating an oscillation wavelength shorter than approx. 660 nm employed by the DVD-exclusive optical system, for example approx. 405 nm. Recently, therefore, optical information recording and reproducing apparatuses compatible with the optical discs of different standards are provided with an optical pick-up device including a light source unit that can output a laser beam in different oscillating wavelengths.

Also, it is known that an optical disc with a higher recording density generally has a more rigorous tolerance against aberration. Accordingly, minimizing spherical aberration is also a critical issue with optical information recording and reproducing apparatus compatible with the DVD and the optical disc according to the new standard.

It is to be noted that the term "optical information recording and reproducing apparatus" herein refers to all apparatuses including an apparatus exclusively for recording information, an apparatus exclusively for reproducing information, and an apparatus that can both record and reproduce information. Also, "compatibility" means that the information recording or reproducing function of the apparatus is maintained unchanged without replacing any part thereof, despite utilizing the optical discs of different standards.

For converging the laser beam on the recording surface of the optical discs of different standards without degrading the quality of information in all cases, it has been proposed to provide a diffracting structure in the optical path of the laser beam. Such proposal can be found, for example, in Japanese Patent Provisional Publications Nos. 2001-93179 (hereafter, referred to as JP 2001-93179A) and HEI 09-54973 (hereafter, referred to as JP H09-54973A).

The publication JP 2001-93179A discloses an optical pickup including a diffracting optical element that generates a laser beam in the level of 400 nm for recording or reproducing information on the optical disc of the new standard, and a laser beam in the level of 650 nm for recording or reproducing information on the DVD. The diffracting optical element in the optical pickup according to JP 2001-93179A utilizes second order diffracting light for recording or reproducing information on the optical disc of the new standard, and first order diffracting light for recording or reproducing information on the DVD. In another occasion, the diffracting optical element utilizes third order diffracting light for recording or reproducing information on the optical disc of the new standard, and the second order secondary diffracting light for recording or reproducing information on the DVD. Such arrangement allows correcting spherical aberration originating from the difference in wavelength of the laser beams, while restraining degradation in diffraction efficiency of the laser beams, thus to form optimal beam spots for recording or reproducing information on the recording surface of the respective optical discs.

The optical pickup according to JP 2001-93179A, however, does not refer to fluctuation of the spherical aberration arising from a minute shift in wavelength of the laser beam employed for the respective optical discs, from the wavelength specified as appropriate (hereinafter, "design wavelength"). When employing the diffracting optical element for attaining compatibility with the optical discs with a cover layer different in thickness, the fluctuation of the spherical aberration resultant from the minute shift in wavelength of the actually employed laser beam from the design wavelength turns out to be particularly prominent. The fluctuation of the spherical aberration may disturb the information recording or reproducing performance, particularly when recording or reproducing the information on the optical disc of the new standard, which has a higher recording density.

The publication JP H09-54973A discloses an optical head unit compatible with the two types of optical disc based on, as the JP 2001-93179A, the diffraction effect of the diffracting optical element. In the optical head unit, the diffracting optical element utilizes first order diffracting light for recording or reproducing information on the optical disc with a higher recording density, and a transmitted light recording or reproducing the information on the optical disc with a lower recording density.

Here, the optical head unit according to JP H09-54973A is only compatible with the DVD and CD (Compact Disc), which has a relatively lower recording density than the DVD. In other words, recording or reproducing the information on an optical disc of the new standard is out of the scope of the optical head unit according to JP H09-54973A. Accordingly, employing the laser beam of the wavelength level of 400 nm in the optical head unit according to JP H09-54973A, results in emergence of various aberrations on the recording surface of the optical disc of the new standard, including the spherical aberration, thus failing in forming a beam spot appropriate for recording or reproducing the information on the optical disc of the new standard. Therefore, the optical head unit according to JP H09-54973A is unable to record and reproduce the information on the optical disc of the new standards. In addition, the optical head unit according to JP H09-54973A does not provide any solution either, for controlling the spherical aberration originating from the minute shift of the laser beam utilized for the optical discs from the design wavelength. Consequently, the technique disclosed in P H09-54973A has the similar drawback to that of JP 2001-93179A.

SUMMARY OF THE INVENTION

The present invention is advantageous in that it provides an optical system and an objective tens for an optical pick-up, capable of effectively restraining degradation in diffraction efficiency to thereby form an appropriate spot on a recording surface of all types of optical discs, based on a diffracting structure employed to attain compatibility with an existing optical disc having a relatively high recording density, and an optical disc according to a new standard having a higher recording density than that of the existing optical disc, as well as of minimizing fluctuation in spherical aberration even when a wavelength of a laser beam for utilizing the optical disc minutely shifts from a design wavelength, and an optical pick-up device equipped with such optical system and objective lens.

According to an aspect of the invention, there is provided an optical system of an optical pick-up that utilizes a first laser beam and a second laser beam different in wavelength, respectively for at least two types of optical discs according to different standards, so as to record information to and/or reproduce information from the respective optical discs. The optical system includes an optical element including at least a phase shift surface among the surfaces thereof, and located closer to a light source than the objective lens. In this configuration, $t1 \leq t2$ is satisfied, where $t1$ represents a thickness of a cover layer of a first optical disc for which the first laser beam is employed for recording or reproducing the information, and $t2$ a thickness of a cover layer of a second optical disc for which the second laser beam, having a longer wavelength than the first laser beam, is employed for recording or reproducing the information. $NA1 \geq NA2$ is satisfied, where $NA1$ represents a numerical aperture of the objective lens necessary for recording or reproducing the information on the first optical disc, and $NA2$ the numerical aperture necessary for recording or reproducing the information on the second optical disc. The phase shift surface includes a first region that converges the first laser beam on a recording surface of the first optical disc, and the second laser beam on a recording surface of the second optical disc, after the laser beams are transmitted through the optical element and the objective lens. The first region includes at least an annular zone structure having an annular zone group including a step that gives an additional optical path length to the first laser beam generally by two wavelengths, with respect to an inner refracting surface at a boundary between adjacent refracting surfaces, and a return step portion located at an outer position of the annular zone group. The return step includes a step that gives an additional optical path length to the first laser beam generally by three wavelengths with respect to an inner refracting surface located inside of the return step, in an opposite direction to the step of the annular zone group.

The optical system thus configured can restrain the fluctuation of the spherical aberration even when the actual wavelength of the laser beam minutely shifts from the design wavelength, especially when recording or reproducing the information on the optical disc according to the new standard (first optical disc). The foregoing configuration also allows effectively suppressing the degradation in diffraction efficiency when recording or reproducing the information on both the optical disc of the new standard and the existing optical disc (second optical disc). Accordingly, the present invention enables forming a beam spot appropriate for recording or reproducing the information on the recording surface of the optical disc, without being affected by a minute fluctuation of the wavelength.

Optionally, the phase shift surface may include a second region provided at an outer location of the first region, so as to serve to converge the first laser beam transmitted through the optical element and the objective lens, but not the second laser beam transmitted through the optical element and the objective lens, when an effective beam diameter of the first laser beam on the input surface of the optical element, provided for obtaining a desired spot diameter on the recording surface of the first optical disc, is set to be larger than an effective beam diameter of the second laser beam on the input surface of the optical element, provided for obtaining a desired spot diameter on the recording surface of the second optical disc. In this case, the second region includes a step that defines a different additional optical path length for the first laser beam from that of the first region, with respect to the inner refracting surface at a boundary between adjacent refracting surfaces.

When providing the second region configured as above, it is preferable that the additional optical path length for the first laser beam is generally one wavelength, or generally minus one wavelength.

Still optionally, the phase shift surface may include a second region provided at an outer location of the first region, so as to serve to converge the second laser beam transmitted through the optical element and the objective lens, but not the first laser beam transmitted through the optical element and the objective lens, when an effective beam diameter of the second laser beam on the input surface of the optical element, provided for obtaining a desired spot diameter on the recording surface of the second optical disc, is set to be larger than an effective beam diameter of the first laser beam on the input surface of the optical element, provided for obtaining a desired spot diameter on the recording surface of the first optical disc. In this case, the second region includes a step that defines a different additional optical path length for the second laser beam from that of the first region, with respect to the inner refracting surface at a boundary between adjacent refracting surfaces.

When providing the second region configured as above, it is preferable that the additional optical path length for the second laser beam is generally one wavelength, or generally minus one wavelength.

Providing thus the second region at an outer location of the first region, including the step that forms a predetermined optical path difference according to the size of the effective beam diameter, allows forming an appropriate spot on the recording surface of the respective optical discs, whichever of the laser beams may be employed.

Here, holding the objective lens and the optical element, constituting the optical system, with a same holder permits effectively inhibiting a relative position shift therebetween, thereby preventing degradation in performance.

According to another aspect of the invention, there is provided an optical pick-up, which is provided with the optical system described as above and a light source that emits at least two types of light beams. The formula (1) is satisfied:

$$0.55 < (\lambda 1/(n1-1))/(\lambda 2/(n2-1)) < 0.65 \tag{1}$$

where $\lambda 1$ represents the wavelength of the first laser beam, $\lambda 2$ the wavelength of the second laser beam, $n1$ a refractive index of the optical element with respect to the wavelength $\lambda 1$, $n2$ a refractive index of the optical element with respect to the wavelength $\lambda 2$.

The optical pick-up thus configured can record information to and/or reproduce information from either of the two types of optical discs of different standards. When the upper limit of the formula (1) is surpassed, the light utilization efficiency is degraded when using the DVD. In a range below the lower limit, the light utilization efficiency is degraded when using the BD or HD-DVD.

According to another aspect of the invention, there is provided an objective lens, incorporated in an optical pick-up that utilizes a first laser beam and a second laser beam different in wavelength, respectively for at least two types of optical discs according to different standards, so as to record information to and/or reproduce information from the respective optical discs. The objective lens includes a phase shift structure at least on one of the surfaces thereof. In this configuration, $t1 \leq t2$ is satisfied, where t1 represents a thickness of a cover layer of a first optical disc for which the first laser beam is employed for recording or reproducing the information, and t2 a thickness of a cover layer of a second optical disc for which the second laser beam, having a longer wavelength than the first laser beam, is employed for recording or reproducing the information. $NA1 \geq NA2$ is satisfied, where NA1 represents a numerical aperture of the objective lens necessary for recording or reproducing the information on the first optical disc, and NA 2 the numerical aperture necessary for recording or reproducing the information on the second optical disc. The phase shift structure includes a first region that converges the first laser beam on a recording surface of the first optical disc, and the second laser beam on a recording surface of the second optical disc. The first region includes at least an annular zone structure having an annular zone group including a step that gives an additional optical path length to the first laser beam generally by two wavelengths, and a return step portion located at an outer position of the annular zone group. The return step includes a step that gives an additional optical path length to the first laser beam generally by three wavelengths with respect to an inner refracting surface located inside of the return step, in an opposite direction to the step of the annular zone group.

Optionally, the phase shift structure may include, like the phase shift surface of the foregoing optical system, a second region provided at an outer location of the first region, so as to serve to converge the first laser beam but not the second laser beam, when an effective beam diameter of the first laser beam on the input surface of the objective lens is set to be larger than an effective beam diameter of the second laser beam on the input surface of the objective lens. In this case, the second region includes a step that defines a different additional optical path length for the first laser beam from that of the first region, with respect to the inner refracting surface at a boundary between adjacent refracting surfaces.

In the second region of the phase shift structure, it is preferable that the additional optical path length for the first laser beam is generally one wavelength, or generally minus one wavelength.

Still optionally, the phase shift structure may include a second region provided at an outer location of the first region, so as to serve to converge the second laser beam but not the first laser beam, when an effective beam diameter of the second laser beam on the input surface of the objective lens is set to be larger than an effective beam diameter of the first laser beam on the input surface of the objective lens. In this case, the second region includes a step that defines a different additional optical path length for the second laser beam from that of the first region, with respect to the inner refracting surface at a boundary between adjacent refracting surfaces.

In the second region of the phase shift structure, it is preferable that the additional optical path length for the second laser beam is generally one wavelength, or generally minus one wavelength.

According to another aspect of the invention, there is provided an optical pick-up, which includes the above mentioned objective lens and a light source that emits at least two types of light beams. In this structure, the following formula (1) is satisfied:

$$0.55<(\lambda 1/(n1-1))/(\lambda 2/(n2-1))<0.65 \tag{1}$$

where $\lambda 1$ represents the wavelength of the first laser beam, 2 the wavelength of the second laser beam, n1 a refractive index of the objective lens with respect to the wavelength $\lambda 1$, n2 a refractive index of the objective lens with respect to the wavelength $\lambda 2$.

The optical pickup device thus configured can record or reproduce the information on or from either of the two types of optical discs of different standards.

According to another aspect of the invention, there is provided an optical system of an optical pick-up that utilizes a first laser beam and a second laser beam different in wavelength, respectively for at least two types of optical discs according to different standards, so as to record information to and/or reproduce information from the respective optical discs. The optical system includes an objective lens; and an optical element including at least a phase shift surface among the surfaces thereof, and located closer to a light source than the objective lens. In this configuration, $t1 \leq t2$ is satisfied, where t1 represents a thickness of a cover layer of a first optical disc for which the first laser beam is employed for recording or reproducing the information, and t2 a thickness of a cover layer of a second optical disc for which the second laser beam, having a longer wavelength than the first laser beam, is employed for recording or reproducing the information. $NA1 \geq NA2$ is satisfied, where NA1 represents a numerical aperture of the objective lens necessary for recording or reproducing the information on the first optical disc, and NA 2 the numerical aperture necessary for recording or reproducing the information on the second optical disc. The phase shift surface includes a first region that converges the first laser beam on a recording surface of the first optical disc, and the second laser beam on a recording surface of the second optical disc, after transmission through the optical element and the objective lens. The first region includes at least an annular zone structure consisting essentially of an annular zone group including a step that shifts a phase of the respective laser beams incident thereupon in a first direction, and a return step portion including a step that shifts a phase of the respective laser beams incident thereupon in a second direction opposite to the first direction. Further, $$-5<|\phi ie-\phi(i-1)m|-|im-\phi ie|<4 \tag{2}$$

is satisfied, where $\phi ie$ (unit:$\lambda$) represents an additional optical path length for the first laser beam with respect to an annular zone located at the vicinity of an optical axis of the optical system, in an outermost annular zone in an i-th annular zone group at the i-th position from the optical axis, and $\phi im$ (unit:$\lambda$) an additional optical path length for the first laser beam with respect to the annular zone located at the vicinity of the optical axis, in an i-th return step portion at the i-th position from the optical axis. $\phi(i-1)=0$ is satisfied when $i=1$.

Still optionally, the optical system may further satisfy the following condition (3):

$$2.7<\phi im-\phi ie|<3.3 \tag{3}$$

The above mentioned optical system may be included in an optical pick-up. In this case, the optical pick-up includes a light source that emits at least two types of light beams. In this structure, the following formula (1) is satisfied:

$$0.55<(\lambda 1/(n1-1))/(\lambda 2/(n2-1))<0.65 \tag{1}$$

where $\lambda 1$ represents the wavelength of the first laser beam, $\lambda 2$ the wavelength of the second laser beam, n1 a refractive index of the optical element with respect to the wavelength $\lambda 1$, n2 a refractive index of the optical element with respect to the wavelength $\lambda 2$.

According to another aspect of the invention, there is provided an objective lens, incorporated in an optical pickup device that utilizes a first laser beam and a second laser beam different in wavelength, respectively for at least two types of optical discs according to different standards, so as to record information to and/or reproduce information from the respective optical discs. The objective lens includes a phase shift structure at least on one of the surfaces thereof. In this configuration, $t1 \leq t2$ is satisfied, where $t1$ represents a thickness of a cover layer of a first optical disc for which the first laser beam is employed for recording or reproducing the information, and $t2$ a thickness of a cover layer of a second optical disc for which the second laser beam, having a longer wavelength than the first laser beam, is employed for recording or reproducing the information. $NA1 \geq NA2$ is satisfied, where $NA1$ represents a numerical aperture of the objective lens necessary for recording or reproducing the information on the first optical disc, and NA 2 the numerical aperture necessary for recording or reproducing the information on the second optical disc. The phase shift structure includes a first region that converges the first laser beam on a recording surface of the first optical disc, and the second laser beam on a recording surface of the second optical disc. The first region includes at least an annular zone structure having an annular zone group, including a step that shifts a phase of the respective laser beams incident thereupon in a first direction, and a return step portion that shifts a phase of the respective laser beams incident thereupon in a second direction opposite to the first direction. Further, $$-5 < |\phi ie - \phi(i-1)m| - |\phi im - \phi ie| < 4 \quad (2)$$

is satisfied, where $\phi ie$ (unit:$\lambda$) represents an additional optical path length for the first laser beam with respect to an annular zone located at the vicinity of an optical axis of the objective lens, in an outermost annular zone in an ith annular zone group at the ith position from the optical axis, and $\phi im$ (unit: $\lambda$) an additional optical path length for the first laser beam with respect to the annular zone located at the vicinity of the optical axis, in an ith return step portion at the i-th position from the optical axis. $\phi(i-1)=0$ is satisfied when $i=1$.

Optionally, the objective lens may further satisfy the following condition (3)

$$2.7 < |\phi im - \phi ie| < 3.3 \quad (3).$$

The above mentioned objective lens may be included in an optical pick-up. In this case, the optical pick-up includes a light source that emits at least two types of light beams. In this structure, the following formula (1) is satisfied:

$$0.55 < (\lambda 1/(n1-1))/(\lambda 2/(n2-1)) < 0.65 \quad (1)$$

where $\lambda 1$ represents the wavelength of the first laser beam, $\lambda 2$ the wavelength of the second laser beam, $n1$ a refractive index of the objective lens with respect to the wavelength $\lambda 1$, $n2$ a refractive index of the objective lens with respect to the wavelength $\lambda 2$.

Accordingly, the present invention allows suppressing the fluctuation of the spherical aberration arising from a shift of the wavelength of the laser beam actually used for recording or reproducing the information, from the design wavelength, because of the stepped structure formed on a surface of the optical element or on a surface of the objective lens. Such structure is especially beneficial when utilizing the optical disc according to the new standard, which has a higher recording density and hence imposes a more rigorous tolerance against the aberration. Besides, the stepped structure also prevents degradation in diffraction efficiency. Consequently, an appropriate spot can be formed on the recording surface of the optical disc when recording or reproducing the information, whichever of the first or the second optical disc may be used.

BRIEF DESCRIPTION OF THE ACCOMPANYING DRAWINGS

DETAILED DESCRIPTION OF THE EMBODIMENTS

Figure 1:
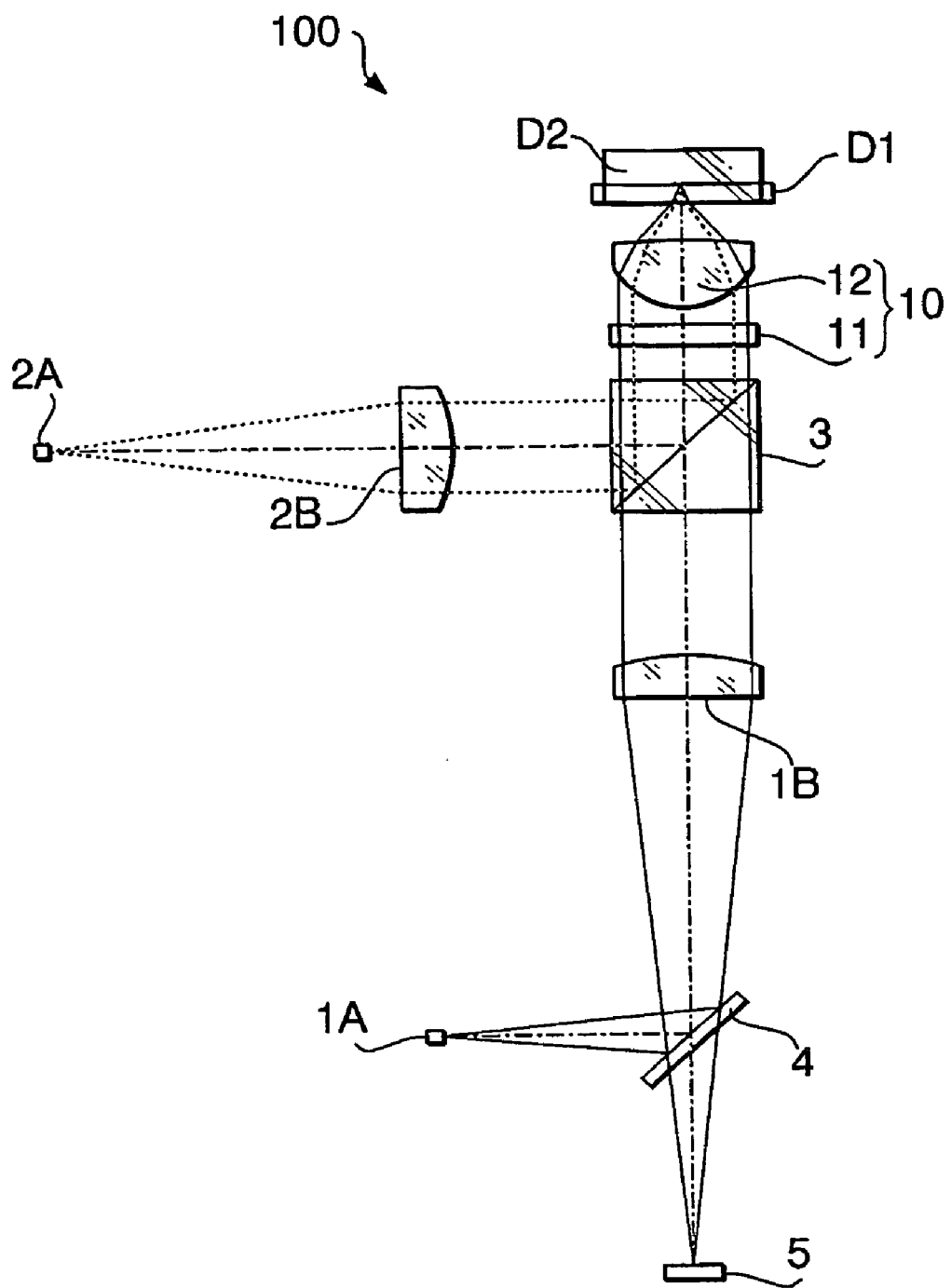
FIG. 1 is a schematic diagram showing a configuration of an optical pickup device including an optical pickup system according to an embodiment of the present invention, and optical discs.

Hereinafter, embodiments according to the invention are described with reference to the accompanying drawings.

The following passages describe an optical pickup device 100 including an optical pickup system 10 according to a first embodiment of the invention, and an optical pickup device 200 including an objective lens 20 according to a second embodiment of the invention. The optical pickup devices 100, 200 are intended to be incorporated in an optical information recording and reproducing apparatus compatible with a first and a second optical discs D1, D2, respectively having a different recording density. The optical discs are both placed on a turntable (not shown) to be rotationally driven, when recording or reproducing information.

The optical discs D1, D2, on which the information is recorded or reproduced by the optical information recording and reproducing apparatus, include a cover layer having a thickness of t1, t2 respectively, which are in a relation defined as $t1 \leq t2$.

When recording or reproducing the information on each of the optical discs D1, D2, the required NA value has to be adjusted, so as to obtain a beam spot according to the difference in recording density. When the ideal design numerical aperture required when recording or reproducing the information on the optical discs D1, D2 is designated by NA1, NA2 respectively, the relation between the NA values is defined as $NA1 \geq NA2$. In other words, when recording or reproducing the information on the first optical disc D1, which has the higher recording density, a smaller spot has to be formed, and hence a higher NA is required.

As specific examples, the first optical disc D1 may be assumed to be an optical disc according to the new standard that stipulates a higher storage capacity than the DVD, such as the BD or HD-DVD. The second optical disc may be assumed to be an optical disc having a relatively high recording density among the existing optical discs, such as the DVD.

When handling the optical discs D1, D2 having different recording densities, laser beams of different wavelengths are employed, so as to obtain a beam spot diameter appropriate for the recording density. Specifically, when recording or reproducing the information on the first optical disc D1, a laser beam having a shortest design wavelength (first wavelength) (hereinafter, "first laser beam") is emitted by a light source, so as to form the beam spot in a smaller diameter on the recording surface of the first optical disc D1. The first wavelength may be set at a level of 400 nm. On the other hand, when recording or reproducing the information on the second optical disc D2, a laser beam having a longer design wavelength (second wavelength) than the first laser beam (hereinafter, "second laser beam") is emitted by a light source, so as to form the spot larger in diameter than the spot on the recording surface of the first optical disc D1, on the recording surface of the second optical disc D2. The second wavelength may be set at a level of 650 nm.

First Embodiment

FIG. 1 is a schematic diagram showing a configuration of the optical pick-up device 100 including the optical system 10 according to the first embodiment, and the optical discs D1, D2. The optical pickup device 100 includes a light source 1A that emits the first laser beam, a light source 2A that emits the second laser beam, collimator lenses 1B, 2B, a beam splitter 3, an optical system 10, a half mirror 4, and a light detector 5. In FIG. 1, the first laser beam is indicated by solid lines, and the second laser beam is indicated by broken lines.

The first laser beam emitted by the light source 1A when utilizing the first optical disc D1 is converted into a collimated beam by the collimator lens 1B, and transmitted through the beam splitter 3 thus to be input to the optical system 10. The first laser beam output from the optical system 10 is converged on the recording surface of the first optical disc D1 placed on the turntable.

The second laser beam emitted by the light source 2A when utilizing the second optical disc D2 is converted into a collimated beam by the collimator lens 2B, and transmitted through the beam splitter 3 thus to be input to the optical system 10. The second laser beam output from the optical system 10 is converged on the recording surface of the second optical disc D2 placed on the turntable.

Here, thus converting the laser beams to be input to the optical system into the collimated beam allows effectively preventing emergence of off-axis aberration such as a coma, in the event of a tracking shift of the optical system.

The laser beams reflected by the recording surface of the respective optical discs D1, D2 are deflected by the half mirror 4, and the received by the light detector 5.

Figure 2:
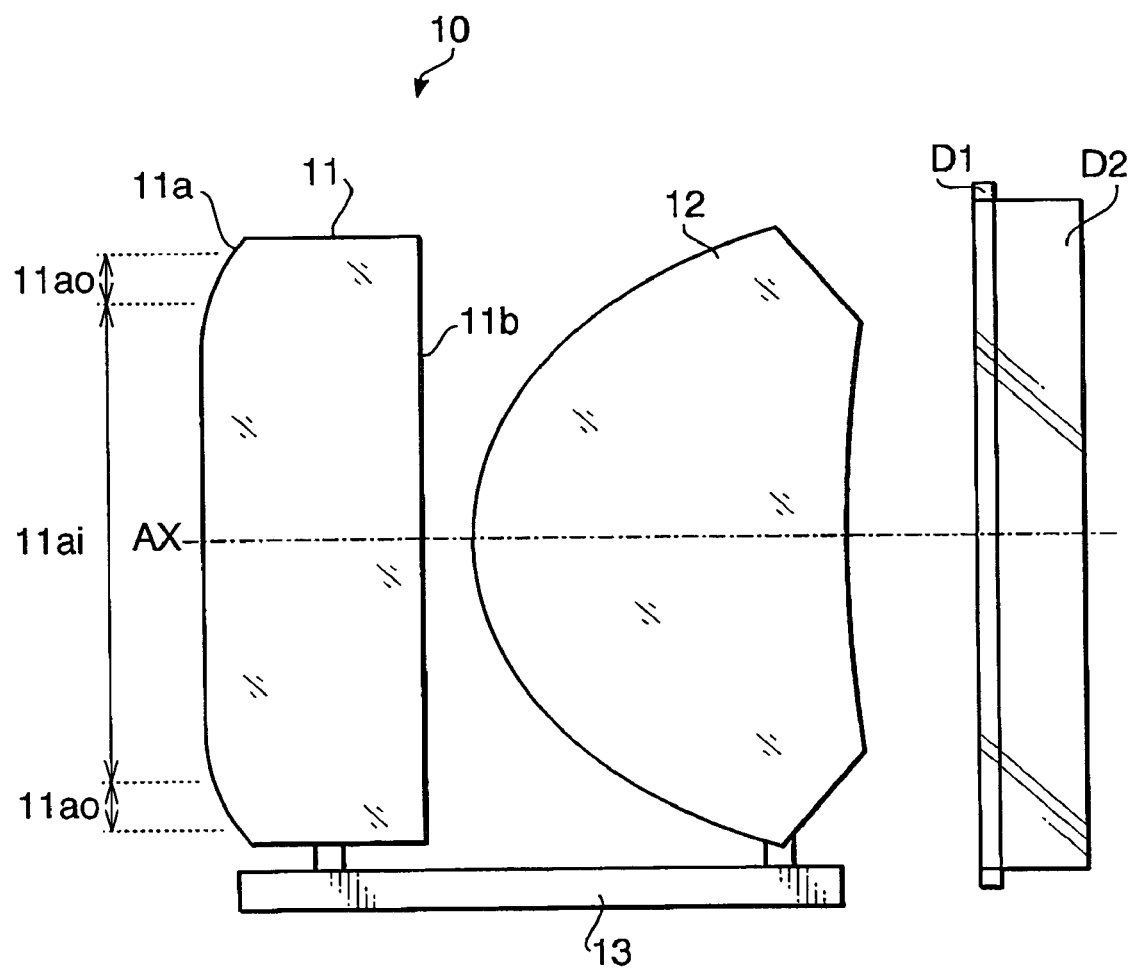
FIG. 2 is an enlarged view of the optical pickup system according to the embodiment.

FIG. 2 is an enlarged view of the optical system 10. The optical system 10 includes a phase shift element 11 and an objective lens 12. The phase shift element 11 and the objective lens 12 are retained by a lens holder 13. When the optical system 10 is thus constituted of a plurality of optical elements, retaining the devices by a same member such as the lens holder 13 prevents degradation in performance because of a relative position shift among the devices, thereby facilitating the drive control in a focusing operation.

The phase shift element 11 includes a first surface 11a and a second surface 11b, the former being located closer to the light source. The first surface 11a serves as a phase shift surface constituted of a phase shift structure including a series of steps to be subsequently described in details. More specifically, the first surface 11a includes an inner region (first region) 11ai around the optical axis AX, and an outer region (second region) 11ao provided around the periphery of the inner region 11ai. The inner region 11ai and the outer region 11ao have different phase shift structures.

In this embodiment, the second surface 11b is a flat surface. In the optical system according to the present invention, however, the second surface 11b of the phase shift element 11 may also be constituted as a phase shift surface, like the first surface 11a.

Figure 3:
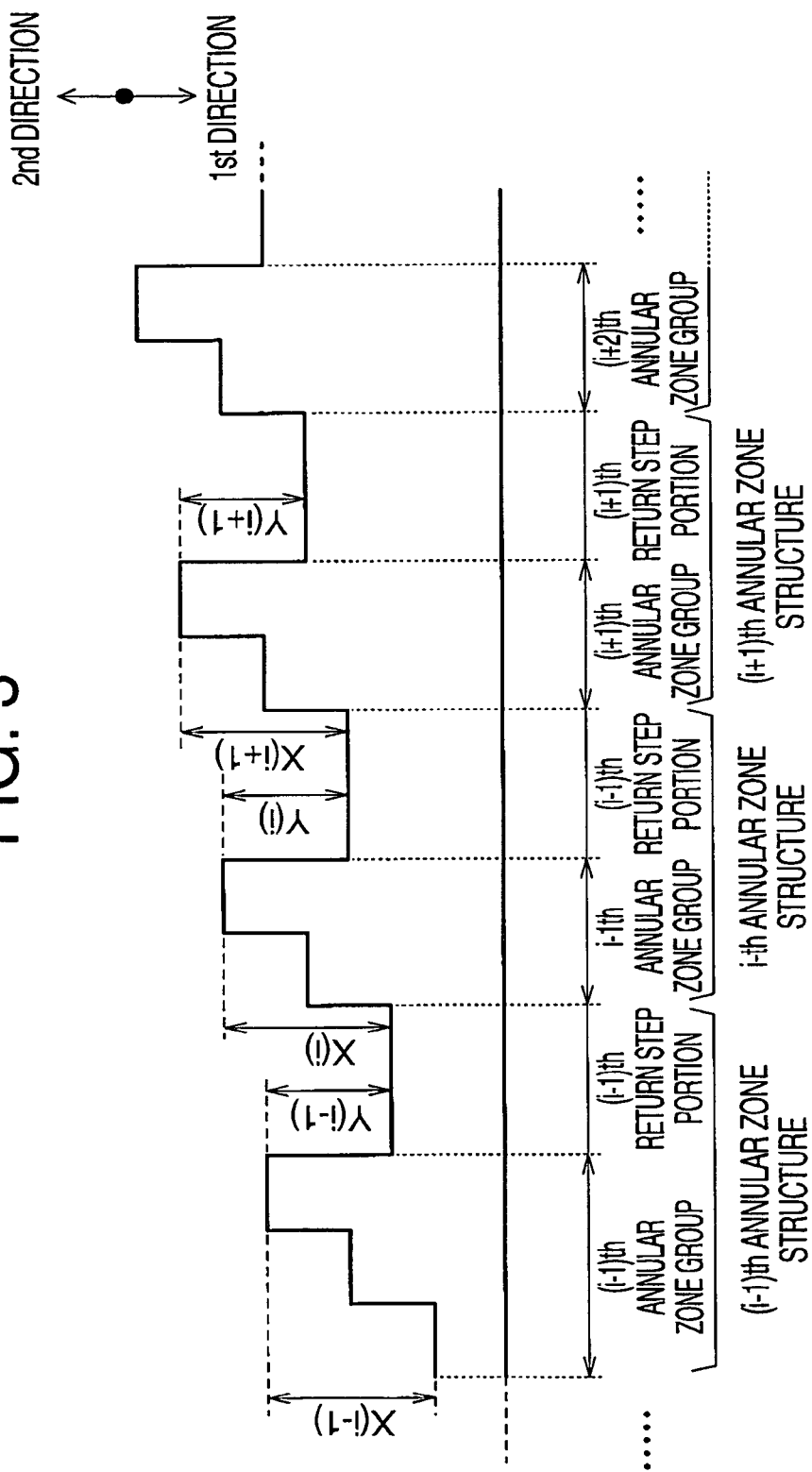
FIG. 3 is a schematic cross-sectional view for explaining an annular zone structure according to the embodiment.

Hereunder, the phase shift structure provided to the inner region 11ai of the first surface 11a will be described in details. The phase shift structure of the inner region 11ai includes a plurality of steps, which constitute an annular zone structure including an annular zone group that shifts a phase of an incident light beam in a first direction (for example a direction from the optical system 10 to the respective optical discs), and a return step portion that shifts the phase in a second direction (for example a direction from the optical system 10 to the light source), opposite to the first direction. FIG. 3 is a schematic cross-sectional view for explaining an annular zone structure. It is to be noted that an additional optical path length referred to in the following description on the phase shift structure is based on the design wavelength of the first laser beam (first wavelength) employed as reference value.

Referring to an annular zone structure located at an i-th position from the optical axis AX (i-th annular zone structure) shown in FIG. 3, the additional optical path lengths at the respective steps included in the annular zone group are all determined in an identical value. Also, when the additional optical path length at the i-th annular zone group included in the i-th annular zone structure is designated by X(i), and the additional optical path length at the i-th return step portion included in the i-th annular zone structure is designated by Y(i), the i-th annular zone structure is formed so as to satisfy the following condition (α).

$$-5 < |X(i)| - |Y(i)| < 4 \qquad (\alpha)$$

Here, with respect to an annular zone located in the vicinity of the optical axis, when the additional optical path length at an outermost annular zone of the i-th annular zone group is designated by $\phi ie$ (unit: λ), and the additional optical path length at the i-th return step portion is designated by $\phi im$ (unit: λ), the condition (α) can be modified as the following condition (2):

$$-5 < |\phi ie - \phi(i-1)m| - |\phi im - \phi ie| < 4 \qquad (2)$$

provided that $\phi(i-1) = 0$ is established when $i=1$.

The condition (2) applies, in particular, to the first optical disc D1, for suppressing fluctuation of the spherical aberration arising from a minute shift of the wavelength of the first laser beam from the first wavelength, when recording or reproducing the information thereon. When the value of the condition (2) is below the lower limit, excessive correction is performed against the fluctuation of the spherical aberration arising from a minute shift of the wavelength of the laser beam used for recording or reproducing the information on the respective optical discs, from the design wavelength. When the value of the condition (2) exceeds the upper limit, the correction of the spherical aberration results in being insufficient. Accordingly, neither of such situations is desirable for high-precision recording or reproduction of the information.

Further, in order to prevent, when recording or reproducing the information on the second optical disc D2, degradation in diffraction efficiency of the second laser beam, thus to form an appropriate spot on the recording surface of the second optical disc D2, the term $|\phi im - \phi ie|$ in the condition (2), i.e. the absolute value of the additional optical path length Y(i) may be defined as the following condition (3):

$$2.7 < |\phi im - \phi ie| < 3.3 \qquad (3)$$

The phase shift structure of the outer region 11ao will be described. The outer region 11ao is provided when different effective beam diameters are required when handling the first optical disc D1 and the second optical disc D2.

When the effective beam diameter required for the first optical disc D1 is larger than the effective beam diameter for the second optical disc D2, the outer region 11ao is configured so as to effectively serve to converge the first laser beam transmitted through the region 11ao on the recording surface of the first optical disc D1, but not to converge the second laser beam transmitted through the region 11ao on the recording surface of the second optical disc D2.

To be more detailed, the phase shift structure of the outer region 11ao includes a plurality of annular zones divided by one or more steps. With such configuration, the additional optical path length for the first laser beam at each step is set to be different from the additional optical path length for the first laser beam defined by the inner region 11ai (more specifically, each step and return step portion in the respective annular zone groups of the inner region 11ai).

Here, when the effective beam diameter required for the second optical disc D2 is larger than the effective beam diameter for the first optical disc D1, the outer region 11ao is configured so as to effectively serve to converge the second laser beam transmitted through the region 11ao on the recording surface of the second optical disc D2, but not to converge the first laser beam transmitted through the region 11ao on the recording surface of the first optical disc D1. In this case, the phase shift structure of the outer region 11ao is formed so as to define a different additional optical path length for the second laser beam from the additional optical path length for the second laser beam defined by the inner region 11ai.

Second Embodiment

Figure 4:
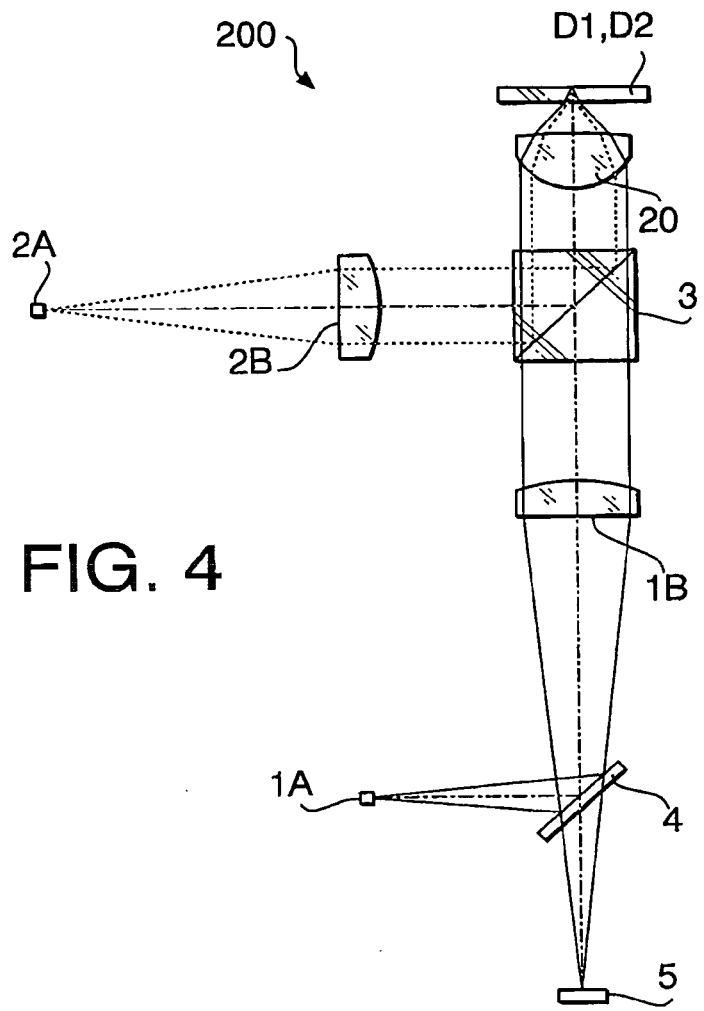
FIG. 4 is a schematic diagram showing a configuration of an optical pickup device including an objective lens according to the embodiment, and the optical discs.

Now description will be made on the optical pickup device 200 according to the second embodiment. FIG. 4 is a schematic diagram showing a configuration of the optical pickup device 200 including an objective lens 20, and the optical discs D1, D2. In FIG. 4, same constituents as those of the optical pickup device 100 are given the same numeral, and description thereof will be omitted where appropriate.

Figure 5:
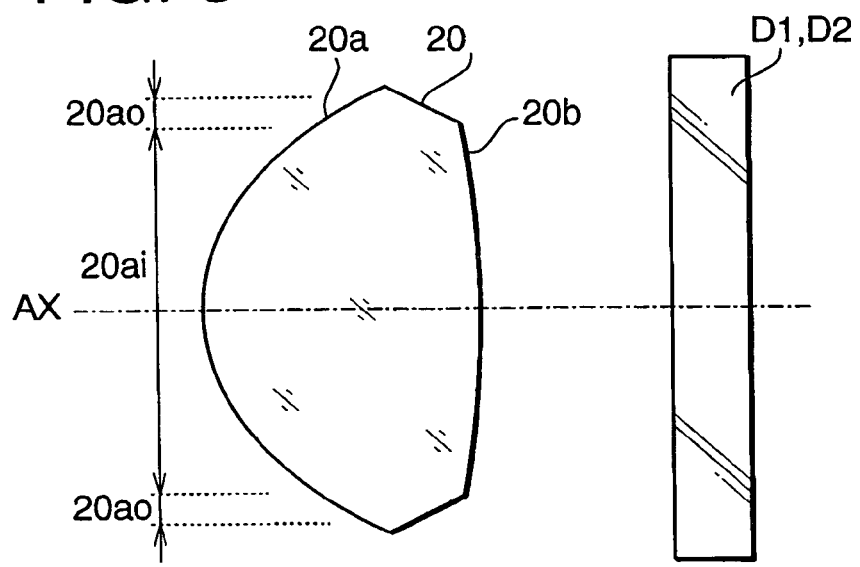
FIG. 5 is an enlarged view of the objective lens according to the embodiment.

FIG. 5 is an enlarged view of the objective lens 20. The objective lens 20 includes a first surface 20a and a second surface 20b, the former being located closer to the light source. The first surface 20a is constituted as a phase shift surface, like the first surface 11a of the phase shift element 11. The first surface 20a includes an inner region 20ai and an outer region 20ao, each having a different phase shift structure. The phase shift structure formed on the regions 20ai, 20ao are the same as that of the regions 11ai, 11ao, and hence the description will be omitted.

The optical pickup devices 100, 200, to be equipped with the optical system 10 and the objective lens 20 configured as above, are designed so as to satisfy the following condition (1), based on a comparison in wavelength between the first laser beam and the second laser beam, made in consideration of the refractive index of the optical element 11 of the optical system 10 and the objective lens 20:

$$0.55 < (\lambda 1/(n1-1))/(\lambda 2/(n2-1)) < 0.65 \qquad (1)$$

where λ1 represents the first wavelength,

λ2 the second wavelength, n1 the refractive index of the optical element 11 of the optical system 10 or the objective lens 20, with respect to the first wavelength λ1, and n2 the refractive index of the optical element 11 of the optical system 10 or the objective lens 20, with respect to the second wavelength λ2.

The optical pickup device equipped with the optical system 10 or objective lens 20 and configured so as to satisfy the condition (1) can improve the diffraction efficiency of the laser beam with both of the optical discs, and more prominently achieves the advantage of suppressing the fluctuation of the spherical aberration arising, when handling the first optical disc in particular, from a minute shift of the wavelength from the first wavelength.

Three concrete examples accompanied with specific numerical data, achieved according to the foregoing embodiments, will be exhibited. A first example represents a specific configuration of the optical pickup device 100, and a second and a third examples represent specific configurations of the optical pickup device 200. Accordingly, the outline of the configuration of the optical pickup devices 100, 200 is as shown in FIG. 1 and FIG. 4. In the first example, it is assumed that the cover layer of the first optical disc D1 is 0.1 mm in thickness and the cover layer of the second optical disc D2 is 0.6 mm in thickness, while in the second and the third example it is assumed that both the first optical disc D1 and the second optical disc D2 have the cover layer of 0.6 mm in thickness.

First Example

Actual specification of the optical system 10 incorporated in the optical pickup device 100 according to the first example is shown in table 1.

TABLE 1

|  | Disc D1 | Disc D2 |
| --- | --- | --- |
| design wavelength (nm) | 405 | 660 |
| focal length (mm) | 2.000 | 2.087 |
| NA | 0.850 | 0.647 |
| magnification | 0.000 | 0.000 |

As indicated by the magnification value in the table 1, the laser beam in the optical pickup device 100 of the first example is input to the optical system 10 in a form of a collimated beam, in the both cases of using the first and the second optical discs D1, D2. Specific numerical configuration of the optical pickup device 100 including the optical system 10 shown in table 1, for handling the optical discs D1, D2, is shown in tables 2 and 3 respectively. For the sake of explicitness in explanation, tables 2 and 3 exclude numerical configuration of components installed between the light source and the optical system 10, and the label surface of the optical discs. Here, the letter E in the tables 2 and 3 is used such that the numeral on the right of E indicates the power exponent of a cardinal number of 10. This also applies to similar tables in the following examples.

TABLE 2

| surface number | r | d | n(405 nm) | n(660 nm) |
| --- | --- | --- | --- | --- |
| 0 |  | ∞ |  |  |
| 1 (h ≦ 1.35) | −12.950 | 1.20 | 1.52469 | 1.50635 |
| 1 (1.35 < h) | 101.530 |  |  |  |
| 2 | ∞ | 0.30 |  |  |
| 3 | 1.451 | 2.10 | 1.71557 | 1.68937 |
| 4 | −41.432 | 0.73 |  |  |
| 5 | ∞ | 0.10 | 1.62231 | 1.57961 |
| 6 | ∞ | — |  |  |

TABLE 3

| surface number | r | d | n(405 nm) | n(660 nm) |
| --- | --- | --- | --- | --- |
| 0 |  | ∞ |  |  |
| 1 (h ≦ 1.35) | −12.950 | 1.20 | 1.52469 | 1.50635 |
| 1 (1.35 < h) | 101.530 |  |  |  |
| 2 | ∞ | 0.30 |  |  |
| 3 | 1.451 | 2.10 | 1.71557 | 1.68937 |
| 4 | −41.432 | 0.50 |  |  |
| 5 | ∞ | 0.60 | 1.62231 | 1.57961 |
| 6 | ∞ | — |  |  |

In tables 2 and 3, r represents a radius of curvature of the surfaces of the lens (unit: mm); d a lens thickness or a spacing between the lenses at the time of recording or reproducing the information (unit: mm); and n(X nm) a refractive index corresponding to the wavelength of X nm. The surface number 1 designates the first surface 11a of the phase shift element 11, and the surface number 2 the first surface 11b of the same device 11. The surface numbers 3, 4 designate the respective surfaces of the objective lens 12, and the surface number s 5, 6 respectively designate the cover layer and the recording surface, of the optical discs.

According to tables 1 to 3, the optical pickup device 100 of the first example gives the value as:

$$(\lambda 1/(n1-1))/(\lambda 2/(n2-1))=0.592$$

from which it is understood that the optical pickup device 100 satisfies the condition (1).

The optical pickup device 100 according to the first example is designed such that the effective beam diameter of the first laser beam on the input surface of the phase shift element 11, provided for achieving a desired spot diameter on the recording surface of the first optical disc, becomes larger than the effective beam diameter of the second laser beam on the input surface of the phase shift element 11, provided for achieving a desired spot diameter on the recording surface of the second optical disc. Accordingly, the first surface 11a (surface number 1) includes the inner region 11ai and the outer region 11ao, each having a different phase shift structure. Here, when the area occupied by these regions in the first surface 11a is designated by h which represents a height from the optical axis AX, the respective regions are defined as follows:

inner region 11ai: h<1.35, outer region 11ao: 1.35<h<1.70

The first surface 11a of the phase shift element 11 and the both surfaces of the objective lens 12 are aspherical surfaces. The shape of the respective aspherical surfaces can be defined by the formula shown below:

$$X(h) = \frac{ch^2}{1+\sqrt{1-(1+K)c^2h^2}} + A_4 h^4 + A_6 h^6 + A_8 h^8 + A_{10} h^{10} + A_{12} h^{12} + \ldots$$

where X(h) represents a distance (sag) of the coordinate point on the aspherical surface having a height h from the optical axis, from the tangential plane on the optical axis of the aspherical surface; c a radius of curvature (1/r) of the aspherical surface on the optical axis; K a conical coefficient; and $A_4, A_6, A_8, A_{10}, A_{12}, \ldots$ the aspherical coefficient of fourth order, sixth order, eighth order, tenth order, twelfth order, . . . .

The conical coefficients and the aspherical coefficients defining the shape of the aspherical surface are shown in table 4. As shown therein, the aspherical surfaces of the inner region 11ai and the outer region 11ao on the first surface 11a have different shapes.

TABLE 4

| | K | A4 | A6 | A8 | A10 | A12 | A14 |
|---|---|---|---|---|---|---|---|
| 1(h ≦ 1.35) | 0.0000 | 1.6030E−02 | 2.7950E−03 | 5.6160E−04 | 1.0350E−04 | −7.5620E−06 | 0.0000E+00 |
| 1(1.35 < h) | 0.0000 | −3.8800E−04 | 0.0000E+00 | 0.0000E+00 | 0.0000E+00 | 0.0000E+00 | 0.0000E+00 |
| 3 | −0.7000 | 1.2250E−02 | 2.6120E−03 | 3.3958E−04 | 2.5405E−04 | −8.1341E−05 | 2.7983E−05 |
| 4 | 0.0000 | 1.2470E−01 | −1.4642E−01 | 1.3775E−01 | −8.8694E−02 | 3.2870E−02 | −5.2264E−03 |

The actual phase shift structure formed on the first surface 11*a* of the phase shift element 11 is shown in table 5. Table 5 indicates the range of the annular zone formed on the first surface 11*a* and the additional optical path length granted to the first laser beam and the second laser beam when transmitted through the annular zones. The range of the annular zones is represented by a height from the optical axis AX, hmin to hmax.

TABLE 5

| | | | annular zone number | h_min | h_max | additional optical path length basis: 405 nm basis: 0-th annular zone | additional optical path length basis: 405 nm difference from adjacent annular zone | additional optical path length basis: 660 nm basis: 0-th annular zone | additional optical path length basis: 660 nm difference from adjacent annular zone |
|---|---|---|---|---|---|---|---|---|---|
| INNER REGION | 1st annular zone structure | 1st annular zone group | 0 | 0.000 | 0.142 | 0.00 | | 0.00 | |
| | | | 1 | 0.142 | 0.248 | −2.00 | −2.00 | −1.18 | −1.18 |
| | | | 2 | 0.248 | 0.323 | −4.00 | −2.00 | −2.37 | −1.18 |
| | | | 3 | 0.323 | 0.387 | −6.00 | −2.00 | −3.55 | −1.18 |
| | | 1st return step portion | 4 | 0.387 | 0.443 | −3.00 | 3.00 | −1.78 | 1.78 |
| | 2nd annular zone structure | 2nd annular zone group | 5 | 0.443 | 0.496 | −5.00 | −2.00 | −2.96 | −1.18 |
| | | | 6 | 0.496 | 0.547 | −7.00 | −2.00 | −4.15 | −1.18 |
| | | | 7 | 0.547 | 0.597 | −9.00 | −2.00 | −5.33 | −1.18 |
| | | 2nd return step portion | 8 | 0.597 | 0.647 | −6.00 | 3.00 | −3.55 | 1.78 |
| | 3rd annular zone structure | 3rd annular zone group | 9 | 0.647 | 0.698 | −8.00 | −2.00 | −4.74 | −1.18 |
| | | | 10 | 0.698 | 0.754 | −10.00 | −2.00 | −5.92 | −1.18 |
| | | | 11 | 0.754 | 0.820 | −12.00 | −2.00 | −7.11 | −1.18 |
| | | 3rd return step portion | 12 | 0.820 | 0.937 | −9.00 | 3.00 | −5.33 | 1.78 |
| | 4th annular zone structure | 4th annular zone group | 13 | 0.937 | 0.981 | −11.00 | −2.00 | −6.51 | −1.18 |
| | | | 14 | 0.981 | 1.075 | −9.00 | 2.00 | −5.33 | 1.18 |
| | | | 15 | 1.075 | 1.117 | −7.00 | 2.00 | −4.15 | 1.18 |
| | | 4th return step portion | 16 | 1.117 | 1.148 | −10.00 | −3.00 | −5.92 | −1.78 |
| | 5th annular zone structure | 5th annular zone group | 17 | 1.148 | 1.173 | −8.00 | 2.00 | −4.74 | 1.18 |
| | | | 18 | 1.173 | 1.194 | −6.00 | 2.00 | −3.55 | 1.18 |
| | | | 19 | 1.194 | 1.213 | −4.00 | 2.00 | −2.37 | 1.18 |
| | | 5th return step portion | 20 | 1.213 | 1.230 | −7.00 | −3.00 | −4.15 | −1.78 |
| | 6th annular zone structure | 6th annular zone group | 21 | 1.230 | 1.245 | −5.00 | 2.00 | −2.96 | 1.18 |
| | | | 22 | 1.245 | 1.259 | −3.00 | 2.00 | −1.78 | 1.18 |
| | | | 23 | 1.259 | 1.273 | −1.00 | 2.00 | −0.59 | 1.18 |
| | | 6th return step portion | 24 | 1.273 | 1.285 | −4.00 | −3.00 | −2.37 | −1.78 |
| | 7th annular zone structure | 7th annular zone group | 25 | 1.285 | 1.297 | −2.00 | 2.00 | −1.18 | 1.18 |
| | | | 26 | 1.297 | 1.307 | 0.00 | 2.00 | 0.00 | 1.18 |
| | | | 27 | 1.307 | 1.318 | 2.00 | 2.00 | 1.18 | 1.18 |
| | | 7th return step portion | 28 | 1.318 | 1.328 | −1.00 | −3.00 | −0.59 | −1.78 |
| | | 8th annular zone group | 29 | 1.328 | 1.337 | 1.00 | 2.00 | 0.59 | 1.18 |
| | | | 30 | 1.337 | 1.346 | 3.00 | 2.00 | 1.78 | 1.18 |
| | | | 31 | 1.346 | 1.350 | 5.00 | 2.00 | 2.96 | 1.18 |
| OUTER REGION | | | 32 | 1.350 | 1.390 | 5.00 | 0.00 | | |
| | | | 33 | 1.390 | 1.470 | 6.00 | 1.00 | | |
| | | | 34 | 1.470 | 1.551 | 7.00 | 1.00 | | |
| | | | 35 | 1.551 | 1.632 | 8.00 | 1.00 | | |
| | | | 36 | 1.632 | 1.700 | 9.00 | 1.00 | | |

As shown in table 5, the phase shift structure of the inner region 11ai includes first to eighth annular zone groups and first to seventh return step portions respectively formed between the annular zone groups. In other words, the phase shift structure of the inner region 11ai includes first to seventh, i.e. seven annular zone structures each including an annular zone group and a return step portion. The annular zone groups respectively include three annular zones, except the first annular zone group. Each annular zone is formed so as to give the additional optical path length to the first laser beam by two wavelengths (or minus two wavelengths). Each return step portion is formed so as to give an additional optical path length to the first laser beam by three wavelengths (or minus three wavelengths) in an opposite direction to the additional optical path length made in the immediately preceding annular zone (in the case of the first return step portion, the annular zone of the number 3). Table 6 shows the values specifying the annular zone structures and the eighth annular zone group, according to the conditions (2) and (3). In view of table 6, it is understood that all of the first the seventh annular zone structures satisfy the conditions (2) and (3).

TABLE 6

|  | φie − φ(i − 1)m | φim − φie | Condition (2) | Condition (3) |
| --- | --- | --- | --- | --- |
| 1st annular zone structure | −6 | 3 | 3 | 3 |
| 2nd annular zone structure | −6 | 3 | 3 | 3 |
| 3rd annular zone structure | −6 | 3 | 3 | 3 |
| 4th annular zone structure | 1 | −3 | −2 | 3 |
| 5th annular zone structure | 6 | −3 | 3 | 3 |
| 6th annular zone structure | 6 | −3 | 3 | 3 |
| 7th annular zone structure | 6 | −3 | 3 | 3 |
| 8th annular zone structure | 6 | 0 | 6 | 0 |

Returning to table 5, the phase shift structure of the outer region 11ao includes a plurality of annular zones. Each annular zone is formed so as to give an additional optical path length to the first laser beam by one wavelength. Such configuration allows the phase shift structure of the outer region 11ao to serve to only converge the first laser beam transmitted through the optical element and the objective lens, and not the second laser beam, thereby providing an aperture restricting function with respect to the second laser beam.

When the phase shift structure provided on the first surface 11a of the phase shift element 11 is construed as a diffracting structure, the diffracting structure can be defined by the following optical path difference function Φ(h).

$$\Phi(h) = (P_2 h^2 + P_4 h^4 + P_6 h^6 + \ldots) m\lambda$$

The optical path difference function Φ(h) provides an optical path length difference between imaginary light that has not been diffracted by the diffracting structure and the light thereby diffracted, on a point at a height h from the optical axis on the diffracting surface (first surface 11a). $P_2$, $P_4$, $P_6$, ... respectively represent the coefficients of second order, fourth order, sixth order, . . . . The optical path difference function coefficients $P_2$, ... defining the diffracting structure are shown in table 7. m represents the diffracting order number where the diffraction efficiency of the laser beams becomes highest in each of the regions 11ai, 11ao. As is apparent from the optical path difference function, the diffracting order number m is specified with respect to each laser beam to be employed and each region where the diffracting structure is provided, the details of which are shown in table 8. As shown in table 8, the inner region 11ai is provided with the diffracting structure that allows serving to converge the first laser beam and the second laser beam. On the other hand, the outer region 11ao is provided with the diffracting structure that allows to converge only the first laser beam transmitted through the optical element and the objective lens, in other words the diffracting structure that limits the aperture of the second laser beam, which forms the effective beam in a smaller diameter on the input surface.

TABLE 7

|  | P2 | P4 | P6 | P8 | P10 | P12 |
| --- | --- | --- | --- | --- | --- | --- |
| 1(h ≦ 1.35) | −2.5000E+01 | 1.0356E+01 | 1.7770E+00 | 4.0800E−01 | 4.2460E−02 | 0.0000E+00 |
| 1(1.35 < h) | 6.4000E+00 | −5.0000E−01 | 0.0000E+00 | 0.0000E+00 | 0.0000E+00 | 0.0000E+00 |

TABLE 8

|  | inner region | outer region |
| --- | --- | --- |
| 1st laser beam | 2nd order | 1st order |
| 2nd laser beam | 1st order | — |

Figure 6A:
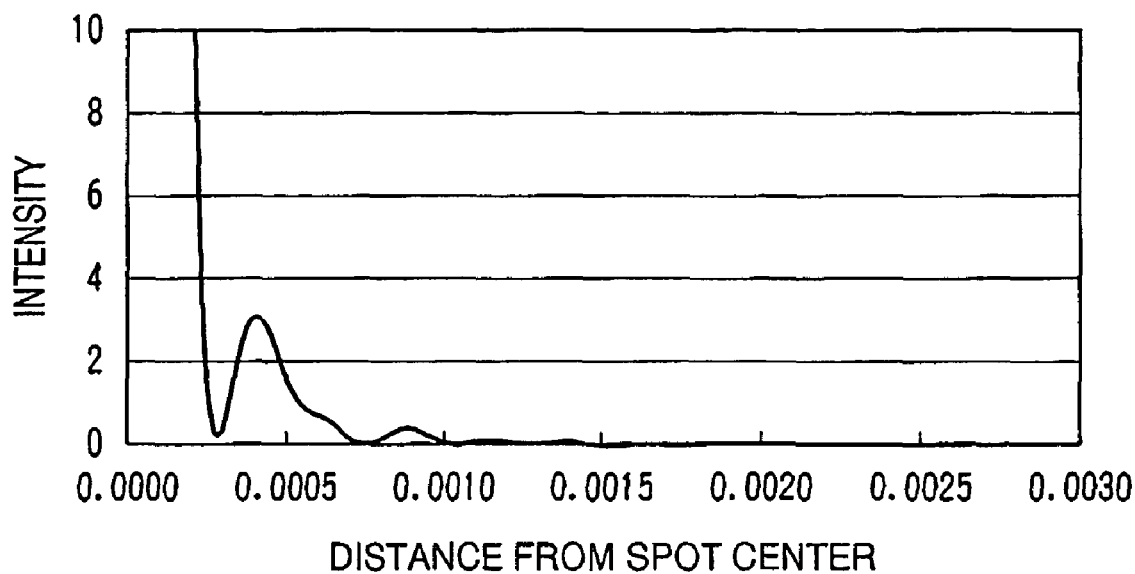
FIG. 6A is a line graph showing a relation between an intensity of a spot formed on the recording surface of a first optical disc by a first laser beam shifted by +5 nm from the design wavelength, and a distance from the center of the spot, in the device according to a first example.
Figure 6B:
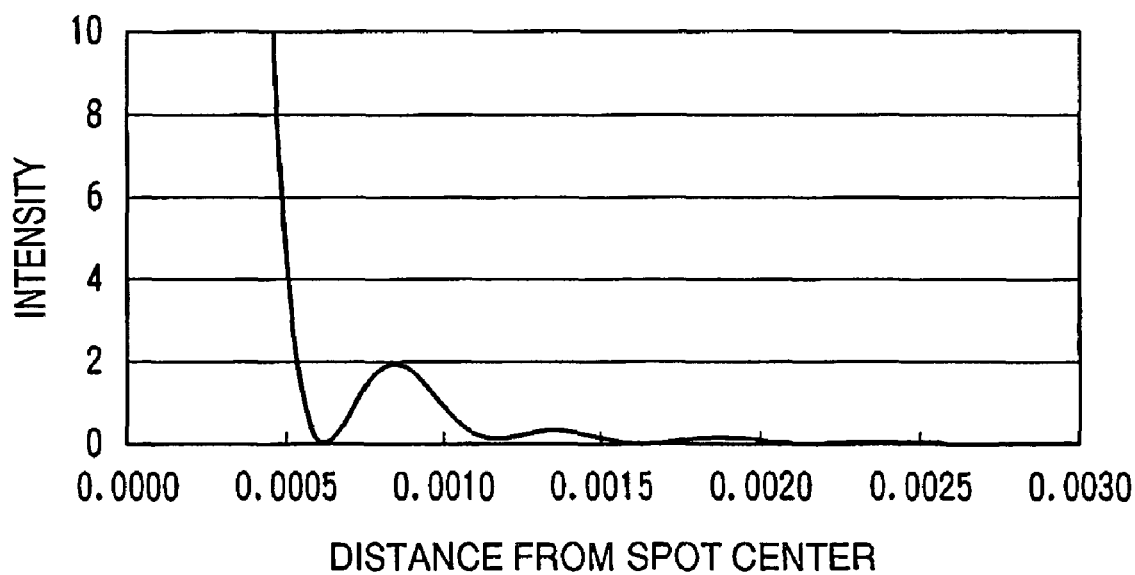
FIG. 6B is a line graph showing a relation between an intensity of a spot formed on the recording surface of a second optical disc by a second laser beam of the design wavelength, and a distance from the center of the spot, in the device according to the first example.
Figure 7A:
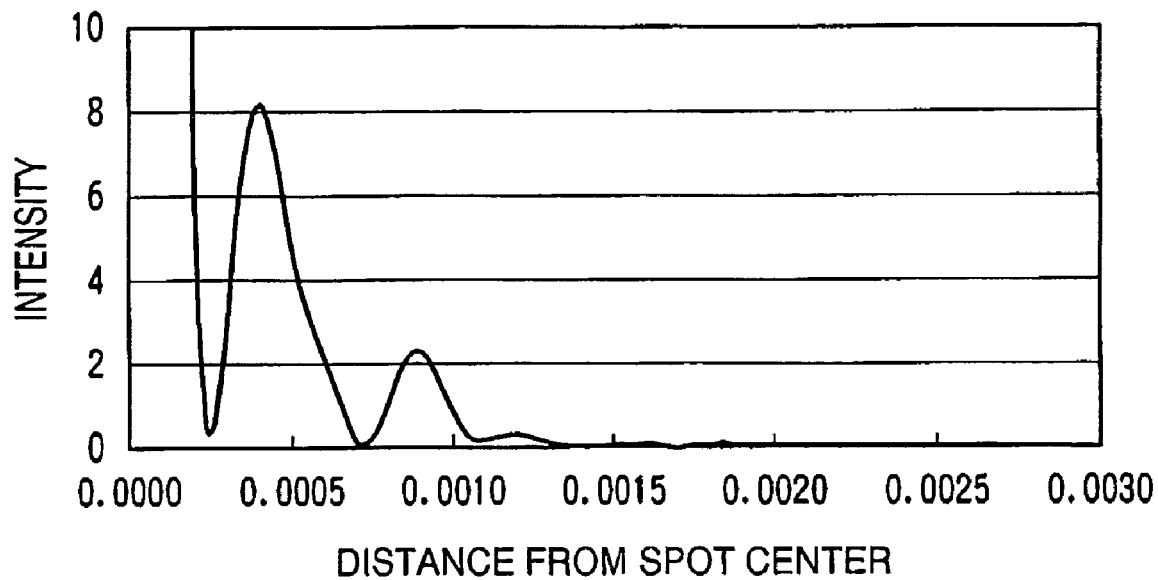
FIG. 7A is a line graph showing a relation between an intensity of a spot formed on the recording surface of a first optical disc by a first laser beam shifted by +5 nm from the design wavelength, and a distance from the center of the spot, in the device according to a first comparative example.
Figure 7B:
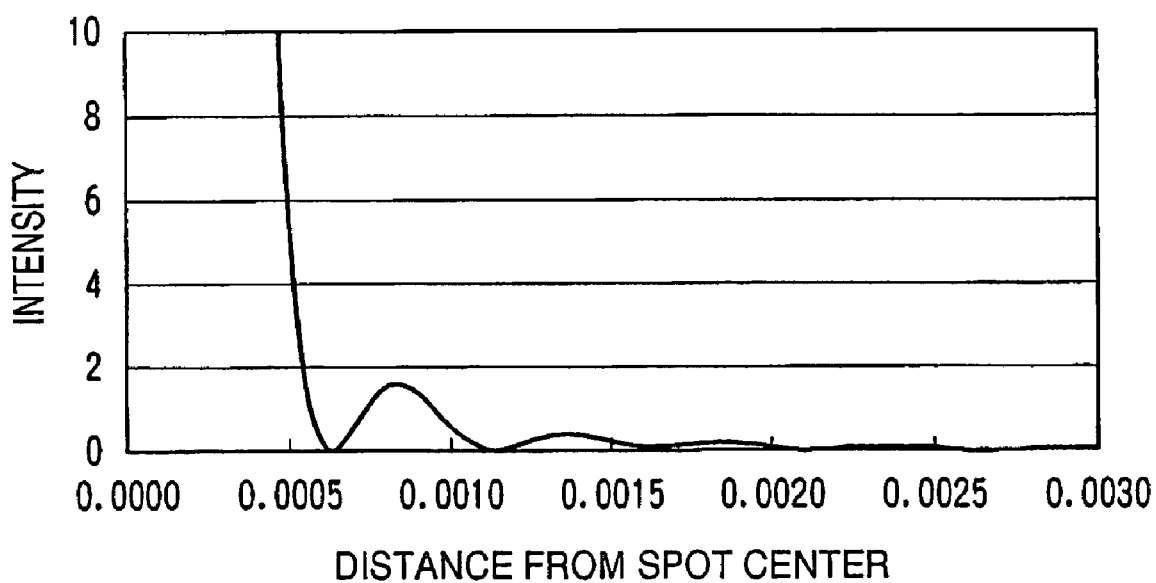
FIG. 7B is a line graph showing a relation between an intensity of a spot formed on the recording surface of a second optical disc by a second laser beam of the design wavelength, and a distance from the center of the spot, in the device according to the first comparative example.

FIG. 6A is a line graph showing a relation between an intensity of a spot formed on the recording surface of the first optical disc D1 by the first laser beam shifted by +5 nm from the design wavelength (405 nm), and a distance from the center of the spot, in the optical pickup device 100 according to the first example. FIG. 6B is a line graph showing a relation between an intensity of a spot formed on the recording surface of the second optical disc D2 by the second laser beam of the design wavelength (660 nm), and a distance from the center of the spot, in the optical pickup device 100 according to the first example. FIG. 7A is a line graph showing a relation between an intensity of a spot formed on the recording surface of the first optical disc D1 by the first laser beam shifted by +5 nm from the design wavelength, and a distance from the center of the spot, in a conventional optical pickup device (hereinafter, "optical pickup device according to a first comparative example") having an annular zone structure without the return step portion, in other words including only the annular zone group. FIG. 7B is a line graph showing a relation between an intensity of a spot formed on the recording surface of the second optical disc D2 by the second laser beam of the design wavelength, and a distance from the center of the spot, in the optical pickup device according to the first comparative example. In these graphs, the vertical axis represents a relative intensity with respect to the intensity at the center of the spot defined as 100, and the horizontal axis represents a distance (unit: mm) from the center of the spot. This also applies to the graphs subsequently referred to concerning the examples 2 and 3.

Through comparison between FIGS. 6A and 7A, it is understood that the optical pickup device 100 of the first example more effectively reduces the intensity of so called a sidelobe emerging around the spot, thereby increasing the intensity at a central portion of the spot, which largely contributes in recording or reproducing the information. Here, in an optical information recording and reproducing apparatus equipped with an optical system generally free from the aberration when utilizing the first optical disc, the spot diameter (at an intensity of 13.5%, which applies hereinafter) formed by the first laser beam of the design wavelength on the recording surface of the first optical disc D1 is 0.397 (μm). While the spot diameter shown in FIG. 7A is 0.359 (μm), the spot diameter shown in FIG. 6A is 0.394 (μm), which is generally the same as the spot diameter formed by a beam of the design wavelength. Also, when the diffraction efficiency in the case of converging the first laser beam of the design wavelength on the recording surface of the first optical disc D1 without aberration is regarded as 100%, the diffraction efficiency of the spot shown in FIG. 7A is 54.1%, while that of the spot shown in FIG. 6A is 86.3%, which shows significant improvement.

Through comparison between FIGS. 6B and 7B, it is understood that the optical pickup device 100 of the first example and the optical pickup device of the first comparative example create the beam spots similar to each other in shape and intensity, including the sidelobe. Here, in an optical information recording and reproducing apparatus equipped with an optical system generally free from the aberration when utilizing the second optical disc, the spot diameter formed by the second laser beam of the design wavelength on the recording surface of the second optical disc D2 is 0.840 (μm). While the spot diameter shown in FIG. 7B is 0.842 (μm), that of FIG. 6B is 0.840 (μm), which is exactly identical to the spot formed by a beam of the design wavelength. Also, when the diffraction efficiency of the light converged on the recording surface of the second optical disc D2 by the second laser beam of the design wavelength without aberration is regarded as 100%, the diffraction efficiency of the spot shown in FIG. 7B is 86.9%, while that of the spot shown in FIG. 6B is 83.5%, which is well within a practically acceptable range, though slightly lower than the first comparative example.

The foregoing comparison indicates that the optical pickup device 100 according to the first example can more effectively suppress the fluctuation of the spherical aberration arising from a minute shift of the wavelength when utilizing the first optical disc D1, than the device of the first comparative example, and form a beam spot with a greater light amount in a most appropriate diameter, on the recording surface of the first optical disc D1. It has also been indicated that the optical pickup device 100 of the first example can still form the beam spot on the recording surface of the second optical disc D2 in generally similar conditions to the device of the first comparative example, while achieving the foregoing benefits with the first optical disc D1. Consequently, the optical pickup device 100 according to the first example can perform, while assuring high-precision recording or reproduction of information on the second optical disc i.e. the existing optical disc, high-precision recording or reproduction of information, regardless of the fluctuation of the wavelength, on the first optical disc D1 which, just because of the higher recording density, imposes a more rigorous tolerance against aberration.

Second Example

Table 9 shows actual specification of the objective lens 20 incorporated in the optical pickup device 200 according to the second example.

TABLE 9

|  | Disc D1 | Disc D2 |
|---|---|---|
| design wavelength (nm) | 405 | 660 |
| focal length (mm) | 3.000 | 3.101 |
| NA | 0.650 | 0.600 |
| magnification | 0.000 | 0.000 |

As indicated by the magnification value in the table 9, the laser beam in the optical pickup device 200 of the second example is, as in the first example, input to the objective lens 20 in a form of a collimated beam, in the both cases of using the first and the second optical discs D1, D2. Specific numerical configuration of the optical pickup device 200 including the objective lens 20 shown in table 9, for handling the optical discs D1, D2, is shown in tables 10 and 11 respectively.

TABLE 10

| surface number | r | d | n(405 nm) | n(660 nm) |
|---|---|---|---|---|
| 0 |  | ∞ |  |  |
| 1 (h ≦ 1.86) | 1.880 | 2.10 | 1.52469 | 1.50635 |
| 1 (1.86 < h) | 1.880 |  |  |  |
| 2 | −5.955 | 1.48 |  |  |
| 3 | ∞ | 0.60 | 1.62231 | 1.57961 |
| 4 | ∞ | — |  |  |

TABLE 11

| surface number | r | d | n(405 nm) | n(660 nm) |
|---|---|---|---|---|
| 0 |  | ∞ |  |  |
| 1 (h ≦ 1.86) | 1.880 | 2.10 | 1.52469 | 1.50635 |
| 1 (1.86 < h) | 1.880 |  |  |  |
| 2 | −5.955 | 1.56 |  |  |
| 3 | 28 | 0.60 | 1.62231 | 1.57961 |
| 4 | ∞ | — |  |  |

In tables 10 and 11, the surface numbers 1, 2 respectively represent the first surface 20a and the second surface 20b of the objective lens 20. The surface numbers 3, 4 respectively represent the cover layer and the recording surface of the optical discs.

According to tables 9 to 11, the optical pickup device 200 of the second example achieves the value as:

$$(\lambda 1/(n1-1))/(\lambda 2/(n2-1))=0.592$$

which satisfies the condition (1), as in the first example.

The optical pickup device 200 according to the second example is designed such that the effective beam diameter of the first laser beam on the input surface of objective lens 20 becomes larger than the effective beam diameter of the second laser beam on the same input surface. Accordingly, the first surface 20a (surface number 1) includes the inner region 20ai and the outer region 20ao, each having a different phase shift structure. Here, when the area occupied by these regions in the first surface 20a is designated by h which represents a height from the optical axis AX, the respective regions are defined as follows:

inner region 20ai: $h \leq 1.86$, outer region 20ao: $1.86 < h < 1.95$

The both surfaces of the objective lens 20 are aspherical surfaces. The conical coefficients and the aspherical coefficients defining the shape of the aspherical surfaces are shown in table 12. As shown therein, the aspherical surfaces of the inner region 20ai and the outer region 20ao on the first surface 20a have different shapes.

TABLE 12

| | K | A4 | A6 | A8 | A10 | A12 | A14 |
|---|---|---|---|---|---|---|---|
| 1(h ≤ 1.86) | −0.6000 | 2.9220E−03 | 1.7260E−04 | 1.0770E−04 | −3.0800E−05 | 6.5273E−06 | 0.0000E+00 |
| 1(1.86 < h) | −0.6000 | 4.3390E−03 | 6.5310E−05 | 1.4320E−05 | −1.6590E−05 | 4.2866E−06 | 0.0000E+00 |
| 2 | 0.0000 | 2.6000E−02 | −8.2980E−03 | 2.3090E−03 | −3.7490E−04 | 2.5790E−05 | 0.0000E+00 |

The actual phase shift structure formed on the first surface 20a of the objective lens 20 is shown in table 13. Table 13 indicates the range of the annular zone formed on the first surface 20a and the additional optical path length granted to the first laser beam and the second laser beam when transmitted through the annular zones. The range of the annular zones is represented by a height from the optical axis AX, hmin to hmax.

TABLE 13

| | | | | | | additional optical path length basis: 405 nm | | additional optical path length basis: 660 nm | |
|---|---|---|---|---|---|---|---|---|---|
| | | | annular zone number | h_min | h_max | basis: 0-th annular zone | difference from adjacent annular zone | basis: 0-th annular zone | difference from adjacent annular zone |
| INNER REGION | 1st annular zone structure | 1st annular zone group | 0 | 0.000 | 0.970 | 0.00 | | 0.00 | |
| | | | 1 | 0.970 | 1.189 | 2.00 | 2.00 | 1.18 | 1.18 |
| | | | 2 | 1.189 | 1.320 | 4.00 | 2.00 | 2.37 | 1.18 |
| | | 1st return step portion | 3 | 1.320 | 1.416 | 1.00 | −3.00 | 0.59 | −1.78 |
| | 2nd annular zone structure | 2nd annular zone group | 4 | 1.416 | 1.493 | 3.00 | 2.00 | 1.78 | 1.18 |
| | | | 5 | 1.493 | 1.556 | 5.00 | 2.00 | 2.96 | 1.18 |
| | | 2nd return step portion | 6 | 1.556 | 1.611 | 2.00 | −3.00 | 1.18 | −1.78 |
| | 3rd annular zone structure | 3rd annular zone group | 7 | 1.611 | 1.658 | 4.00 | 2.00 | 2.37 | 1.18 |
| | | | 8 | 1.658 | 1.701 | 6.00 | 2.00 | 3.55 | 1.18 |
| | | 3rd return step portion | 9 | 1.701 | 1.739 | 3.00 | −3.00 | 1.78 | −1.78 |
| | 4th annular zone structure | 4th annular zone group | 10 | 1.739 | 1.774 | 5.00 | 2.00 | 2.96 | 1.18 |
| | | | 11 | 1.774 | 1.806 | 7.00 | 2.00 | 4.15 | 1.18 |
| | | 4th return step portion | 12 | 1.806 | 1.836 | 4.00 | −3.00 | 2.37 | −1.78 |
| | | 5th annular zone group | 13 | 1.836 | 1.860 | 6.00 | 2.00 | 3.55 | 1.18 |
| OUTER REGION | | | 14 | 1.860 | 1.876 | 10.00 | 4.00 | | |
| | | | 15 | 1.876 | 1.896 | 11.00 | 1.00 | | |
| | | | 16 | 1.896 | 1.915 | 12.00 | 1.00 | | |
| | | | 17 | 1.915 | 1.934 | 13.00 | 1.00 | | |
| | | | 18 | 1.934 | 1.950 | 14.00 | 1.00 | | |

As shown in table 13, the phase shift structure of the inner region 20ai includes first to fifth annular zone groups and first to fourth return step portions respectively formed between the annular zone groups. In other words, the phase shift structure of the inner region 20ai includes first to fourth, i.e. four annular zone structures each including an annular zone group and a return step portion. Each annular zone group includes two annular zones, except the first annular zone group. Each of the annular zones is formed to give an additional optical path length to the first laser beam by two wavelengths. Each return step portion is formed so as to give an additional optical path length to the first laser beam by three wavelengths in an opposite direction to the additional optical path length made in the immediately preceding annular zone (in the case of the first return step portion, the annular zone of the number 2). Table 14 shows the values specifying the annular zone structures and the fifth annular zone group, according to the conditions (2) and (3). In view of table 14, it is understood that all of the first the fourth annular zone structures satisfy the conditions (2) and (3).

TABLE 14

|  | $\phi ie - \phi(i-1)m$ | $\phi im - \phi ie$ | Condition (2) | Condition (3) |
|---|---|---|---|---|
| $1^{st}$ annular zone structure | 4 | −3 | 1 | 3 |
| $2^{nd}$ annular zone structure | 4 | −3 | 1 | 3 |
| $3^{rd}$ annular zone structure | 4 | −3 | 1 | 3 |
| $4^{th}$ annular zone structure | 4 | −3 | 1 | 3 |
| $5^{th}$ annular zone structure | 2 | 0 | 2 | 0 |

Returning to table 13, the phase shift structure of the outer region 20ao includes a plurality of annular zones. Each annular zone is formed so as to give the additional optical path length of to the first laser beam by one wavelength.

Table 15 shows an optical path difference function coefficients $P_2, \ldots$ defined when the phase shift structure provided on the first surface 20a of the objective lens 20 is construed as a diffracting structure. The diffracting order number m is shown in table 16. As shown in table 16, the inner region 20ai is provided with the diffracting structure that allows serving to converge the first laser beam and the second laser beam. On the other hand, the outer region 20ao is provided with the diffracting structure that allows to converge only the first laser beam, in other words the diffracting structure that limits the aperture of the second laser beam.

Figure 8A:
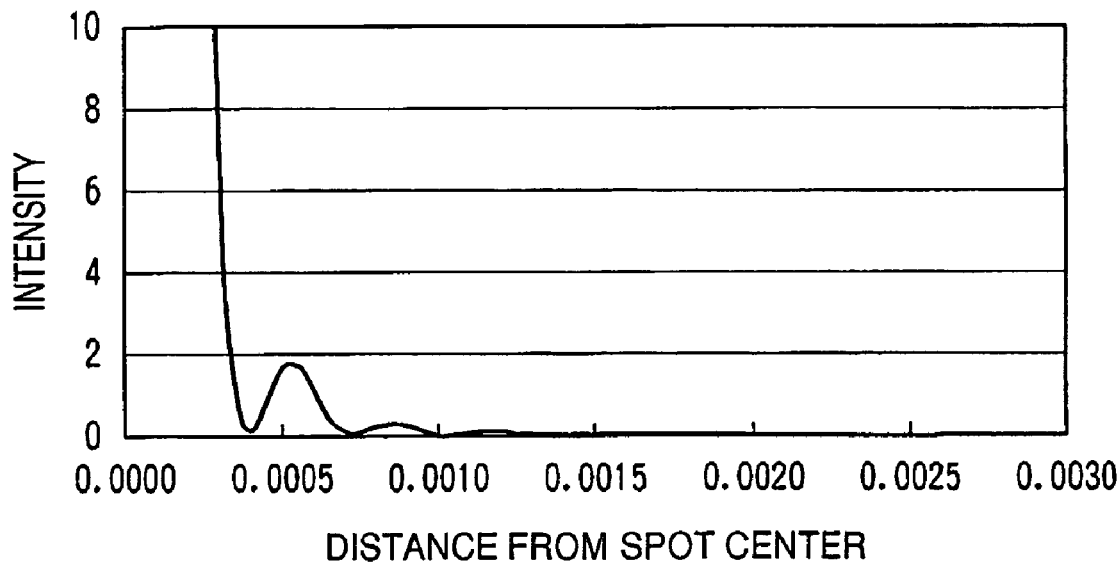
FIG. 8A is a line graph showing a relation between an intensity of a spot formed on the recording surface of a first optical disc by a first laser beam shifted by +5 nm from the design wavelength, and a distance from the center of the spot, in the device according to a second example.
Figure 8B:
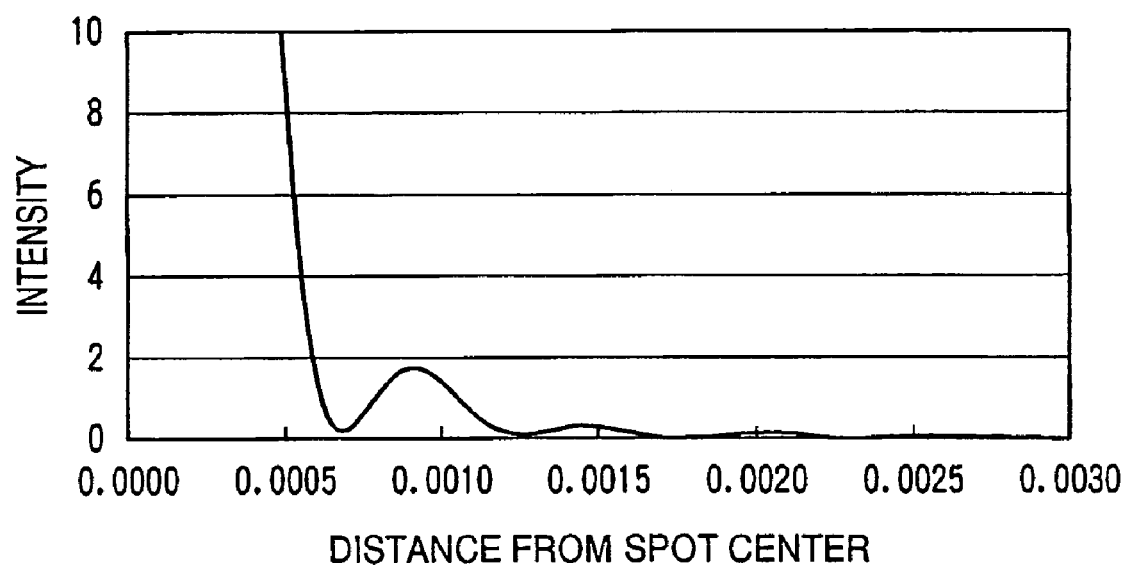
FIG. 8B is a line graph showing a relation between an intensity of a spot formed on the recording surface of a second optical disc by a second laser beam of the design wavelength, and a distance from the center of the spot, in the device according to the second example.
Figure 9A:
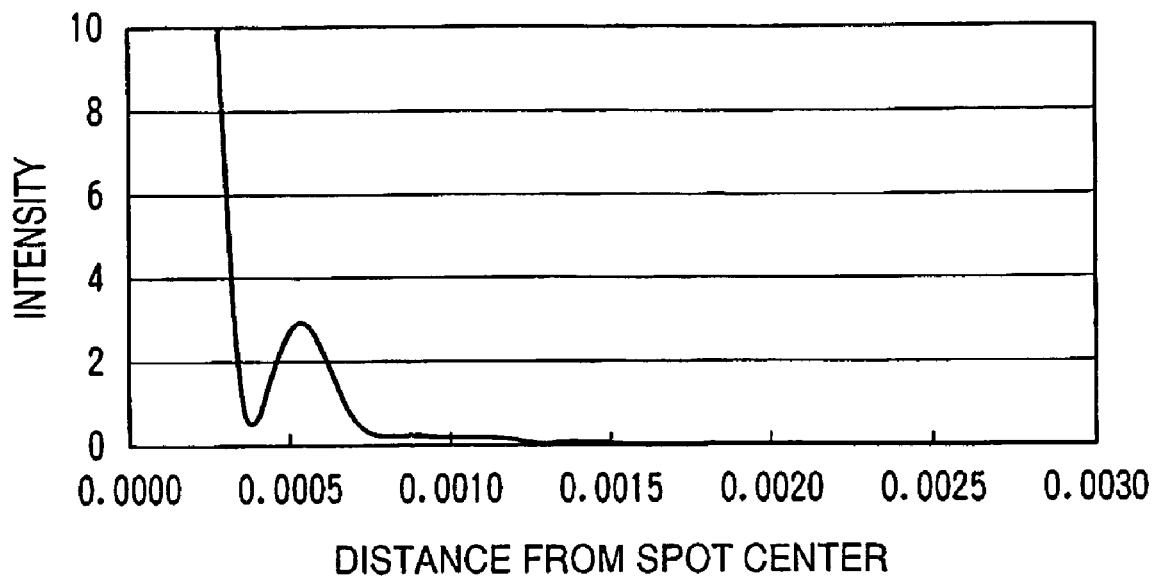
FIG. 9A is a line graph showing a relation between an intensity of a spot formed on the recording surface of a first optical disc by a first laser beam shifted by +5 mm from the design wavelength, and a distance from the center of the spot, in the device according to a second comparative example.
Figure 9B:
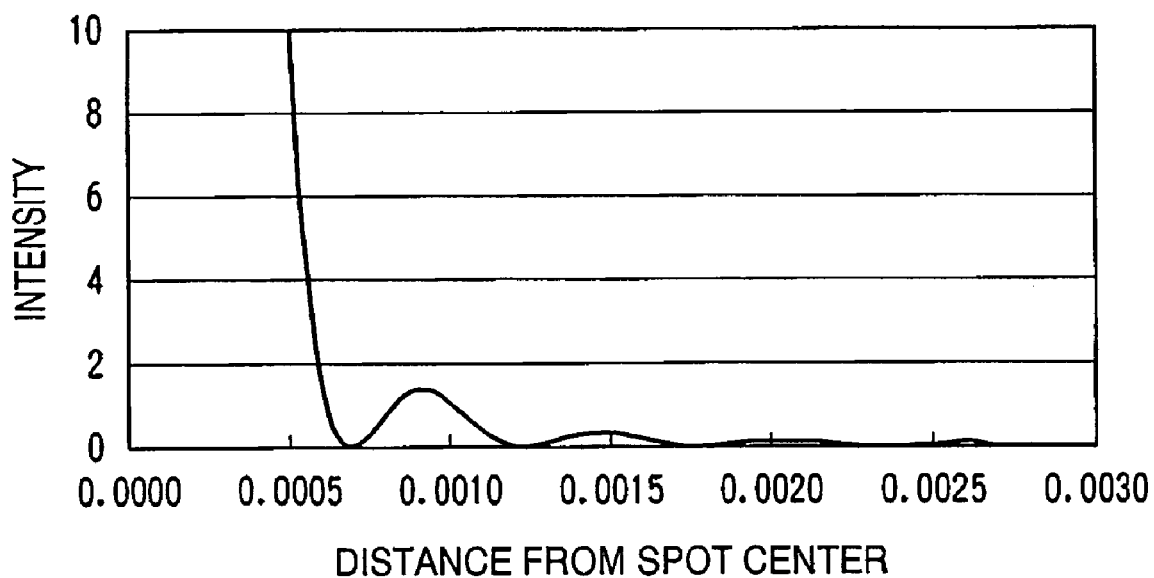
FIG. 9B is a line graph showing a relation between an intensity of a spot formed on the recording surface of a second optical disc by a second laser beam of the design wavelength, and a distance from the center of the spot, in the device according to the second comparative example.

FIG. 8A is a line graph showing a relation between an intensity of a spot formed on the recording surface of the first optical disc D1 by the first laser beam shifted by +5 nm from the design wavelength, and a distance from the center of the spot, in the optical pickup device 200 according to the second example. FIG. 8B is a line graph showing a relation between an intensity of a spot formed on the recording surface of the second optical disc D2 by the second laser beam of the design wavelength, and a distance from the center of the spot, in the optical pickup device 200 according to the second example. FIG. 9A is a line graph showing a relation between an intensity of a spot formed on the recording surface of the first optical disc D1 by the first laser beam shifted by +5 mm from the design wavelength, and a distance from the center of the spot, in a conventional optical pickup device (hereinafter, "optical pickup device according to second comparative example") having the same configuration as the second example except for not including the return step portion, in other words including only the annular zone group. FIG. 9B is a line graph showing a relation between an intensity of a spot formed on the recording surface of the second optical disc D2, by the second laser beam of the design wavelength, and a distance from the center of the spot, in the optical pickup device according to the second comparative example.

Through comparison between FIGS. 8A and 9A, it is understood that the optical pickup device 200 of the second example more effectively reduces the intensity of so called a sidelobe emerging around the spot, thereby increasing the intensity at a central portion of the spot, which largely contributes in recording or reproducing the information. Here, in an optical information recording and reproducing apparatus for exclusive use with the first optical disc, having the same configuration as the second example except for including the objective lens generally free from the aberration when using the first optical disc, the spot diameter to be formed by the first laser beam of the design wavelength on the recording surface of the first optical disc D1 is 0.520 (μm). The spot diameter shown in FIG. 9A is 0.522 (μm), and the spot diameter shown in FIG. 8A is 0.524 (μm), which are generally the same as the spot diameter formed by a beam of the design wavelength. Also, when the diffraction efficiency in the case of converging the first laser beam of the design wavelength on the recording surface of the first optical disc D1 without aberration is regarded as 100%, the diffraction efficiency of the spot shown in FIG. 9A is 85.4%, while that of the spot shown in FIG. 8A is 94.3%, which shows visible improvement.

Through comparison between FIGS. 8B and 9B, it is understood that the optical pickup device 200 of the second example and the optical pickup device of the second com-

TABLE 15

|  | P2 | P4 | P6 | P8 | P10 | P12 |
|---|---|---|---|---|---|---|
| 1(h ≦ 1.86) | 0.0000E+00 | 8.1670E−01 | 8.0350E−03 | 2.4570E−02 | 0.0000E+00 | 0.0000E+00 |
| 1(1.86 < h) | 0.0000E+00 | 3.5050E+00 | −2.9670E−01 | 0.0000E+00 | 0.0000E+00 | 0.0000E+00 |

TABLE 16

|  | inner region | outer region |
|---|---|---|
| $1^{st}$ laser beam | $2^{nd}$ order | $1^{st}$ order |
| $2^{nd}$ laser beam | $1^{st}$ order | — | parative example create the beam spots similar to each other in shape and intensity, including the sidelobe. Here, in an optical information recording and reproducing apparatus for exclusive use with the second optical disc, having the same configuration as the second example except for including the objective lens generally free from the aberration when using the second optical disc, the spot diameter to be formed by the second laser beam of the design wavelength on the recording surface of the second optical disc D2 is 0.918 (μM). The spot diameter shown in FIG. 9B is 0.917 (μm), and that of FIG. 8B is 0.916 (μm), which are generally the same as the spot formed by a beam of the design wavelength. Also, when the diffraction efficiency in the case of converging the second laser beam of the design wavelength on the recording surface of the second optical disc D2 without aberration is regarded as 100%, the diffraction efficiency of the spot shown in FIG. 9B is 91.7%, while that of the spot shown in FIG. 8B is 88.7%, which is well within a practically acceptable range, though slightly lower than the second comparative example.

The foregoing comparison proves that the optical pickup device 200 according to the second example can more effectively suppress the fluctuation of the spherical aberration arising from a minute shift of the wavelength when utilizing the first optical disc D1, than the device of the second comparative example, and form a beam spot with a greater light amount in a most appropriate diameter, on the recording surface of the first optical disc D1. It has also been proven that the optical pickup device 200 of the second example can still form the beam spot on the recording surface of the second optical disc D2 in generally similar conditions to the device of the second comparative example, while achieving the foregoing benefits with the first optical disc D1. Consequently, the optical pickup device 200 according to the second example can perform, while assuring high-precision recording or reproduction of information on the second optical disc i.e. the existing optical disc, high-precision recording or reproduction of information, regardless of the fluctuation of the wavelength, on the first optical disc D1 which, just because of the higher recording density, imposes a more rigorous tolerance against aberration.

Third Example

Table 17 shows actual specification of the objective lens 20 incorporated in the optical pickup device 200 according to the third example.

TABLE 17

|  | BD | DVD |
| --- | --- | --- |
| design wavelength (nm) | 405 | 660 |
| focal length (mm) | 3.100 | 3.206 |
| NA | 0.650 | 0.649 |
| magnification | 0.000 | 0.000 |

As indicated by the magnification value in the table 17, the laser beam in the optical pickup device 200 of the third example is, as in the second example, input to the objective lens 20 in a form of a collimated beam, in the both cases of using the first and the second optical discs D1, D2. Specific numerical configuration of the optical pickup device 200 including the objective lens 20 shown in table 17, for handling the optical discs D1, D2, is shown in tables 18 and 19 respectively. The surface numbers 1 to 4 represent the identical surfaces as those referred to in the description of the second example.

TABLE 18

| surface number | r | d | n(405 nm) | n(660 nm) |
| --- | --- | --- | --- | --- |
| 0 |  | ∞ |  |  |
| 1(h ≦ 2.015) | 1.922 | 2.00 | 1.52469 | 1.50635 |
| 1(2.015 < h) | 1.922 |  |  |  |
| 2 | −6.792 | 1.62 |  |  |
| 3 | ∞ | 0.60 | 1.62231 | 1.57961 |
| 4 | ∞ | — |  |  |

TABLE 19

| surface number | r | d | n(405 nm) | n(660 nm) |
| --- | --- | --- | --- | --- |
| 0 |  | ∞ |  |  |
| 1(h ≦ 2.015) | 1.922 | 2.00 | 1.52469 | 1.50635 |
| 1(2.015 < h) | 1.922 |  |  |  |
| 2 | −6.792 | 1.70 |  |  |
| 3 | ∞ | 0.60 | 1.62231 | 1.57961 |
| 4 | ∞ | — |  |  |

According to tables 17 to 19, the optical pickup device 200 of the third example also achieves the value as:

$$(\lambda 1/(n1-1))/(\lambda 2/(n2-1))=0.592$$

which satisfies the condition (1), as in the first example.

The optical pickup device 200 according to the third example is designed, unlike the foregoing examples, such that the effective beam diameter of the second laser beam on the input surface of objective lens 20 becomes larger than the effective beam diameter of the first laser beam on the same input surface. Accordingly, the first surface 20a (surface number 1) includes the inner region 20ai and the outer region 20ao, each having a different phase shift structure. Here, when the area occupied by these regions in the first surface 20a is designated by h which represents a height from the optical axis AX, the respective regions are defined as follows:

inner region 20ai: h<2.015, outer region 20ao: 2.015<h<2.080

The both surfaces of the objective lens 20 are aspherical surfaces. The conical coefficients and the aspherical coefficients defining the shape of the aspherical surfaces are shown in table 20. As shown therein, the aspherical surfaces of the inner region 20ai and the outer region 20ao on the first surface 20a have different shapes.

TABLE 20

|  | K | A4 | A6 | A8 | A10 | A12 | A14 |
| --- | --- | --- | --- | --- | --- | --- | --- |
| 1(h ≦ 2.015) | −0.6000 | 2.3870E−03 | 2.7810E−04 | 4.7680E−05 | −5.0470E−06 | 3.1275E−06 | 0.0000E+00 |
| 1(2.015 < h) | −0.6000 | −2.8210E−03 | 3.6580E−04 | 1.2790E−03 | −3.6660E−04 | 3.6399E−05 | 0.0000E+00 |
| 2 | 0.0000 | 1.9010E−02 | −4.7330E−03 | 1.2450E−03 | −2.0850E−04 | 1.5054E−05 | 0.0000E+00 |

The actual phase shift structure formed on the first surface 20a of the objective lens 20 is shown in table 21. Table 21 indicates the range of the annular zone formed on the first surface 20a and the additional optical path length granted to the first laser beam and the second laser beam when transmitted through the annular zones. The range of the annular zones is represented by a height from the optical axis AX, hmin to hmax.

TABLE 21

| | | | annular zone number | h_min | h_max | additional optical path length basis: 405 nm basis: 0-th annular zone | additional optical path length basis: 405 nm difference from adjacent annular zone | additional optical path length basis: 660 nm basis: 0-th annular zone | additional optical path length basis: 660 nm difference from adjacent annular zone |
|---|---|---|---|---|---|---|---|---|---|
| INNER REGION | 1st annular zone structure | 1st annular zone group | 0 | 0.000 | 1.001 | 0.00 | | 0.00 | |
| | | | 1 | 1.001 | 1.220 | 2.00 | 2.00 | 1.18 | 1.18 |
| | | | 2 | 1.220 | 1.351 | 4.00 | 2.00 | 2.37 | 1.18 |
| | | | 3 | 1.351 | 1.448 | 6.00 | 2.00 | 3.55 | 1.18 |
| | | 1st return step portion | 4 | 1.448 | 1.525 | 3.00 | −3.00 | 1.78 | −1.78 |
| | 2nd annular zone structure | 2nd annular zone group | 5 | 1.525 | 1.589 | 5.00 | 2.00 | 2.96 | 1.18 |
| | | | 6 | 1.589 | 1.644 | 7.00 | 2.00 | 4.15 | 1.18 |
| | | | 7 | 1.644 | 1.693 | 9.00 | 2.00 | 5.33 | 1.18 |
| | | 2nd return step portion | 8 | 1.693 | 1.736 | 6.00 | −3.00 | 3.55 | −1.78 |
| | 3rd annular zone structure | 3rd annular zone group | 9 | 1.736 | 1.775 | 8.00 | 2.00 | 4.74 | 1.18 |
| | | | 10 | 1.775 | 1.811 | 10.00 | 2.00 | 5.92 | 1.18 |
| | | | 11 | 1.811 | 1.844 | 12.00 | 2.00 | 7.11 | 1.18 |
| | | 3rd return step portion | 12 | 1.844 | 1.875 | 9.00 | −3.00 | 5.33 | −1.78 |
| | 4th annular zone structure | 4th annular zone group | 13 | 1.875 | 1.904 | 11.00 | 2.00 | 6.51 | 1.18 |
| | | | 14 | 1.904 | 1.931 | 13.00 | 2.00 | 7.70 | 1.18 |
| | | 4th return step portion | 15 | 1.931 | 1.956 | 10.00 | −3.00 | 5.92 | −1.78 |
| | | 5th annular zone group | 16 | 1.956 | 1.980 | 12.00 | 2.00 | 7.11 | 1.18 |
| | | | 17 | 1.980 | 2.003 | 14.00 | 2.00 | 8.29 | 1.18 |
| | | | 18 | 2.003 | 2.015 | 16.00 | 2.00 | 9.47 | 1.18 |
| OUTER REGION | | | 19 | 2.015 | 2.030 | | | 10.00 | 0.53 |
| | | | 20 | 2.030 | 2.040 | | | 11.00 | 1.00 |
| | | | 21 | 2.040 | 2.050 | | | 12.00 | 1.00 |
| | | | 22 | 2.050 | 2.059 | | | 13.00 | 1.00 |
| | | | 23 | 2.059 | 2.068 | | | 14.00 | 1.00 |
| | | | 24 | 2.068 | 2.077 | | | 15.00 | 1.00 |
| | | | 25 | 2.077 | 2.080 | | | 16.00 | 1.00 |

A shown in the phase shift structure of the inner region 20ai includes first to fifth annular zone groups and first to fourth return step portions respectively formed between the annular zone groups. In other words, the phase shift structure of the inner region 20ai includes first to fourth, i.e. four annular zone structures each including an annular zone group and a return step portion. Each annular zone group includes three annular zones, except the first annular zone group. Each of the annular zones is formed to give an additional optical path length to the first laser beam by two wavelengths. Each return step portion is formed so as to give an additional optical path length to the first laser beam by three wavelengths in an opposite direction to the additional optical path length made in the immediately preceding annular zone (in the case of the first return step portion, the annular zone of the number 3). Table 22 shows the values specifying the annular zone structures and the fifth annular zone group, according to the conditions (2) and (3). In view of table 22, it is understood that all of the first the fourth annular zone structures satisfy the conditions (2) and (3).

TABLE 22

| | $\phi ie - \phi(i - 1)m$ | $\phi im - \phi ie$ | Condition (2) | Condition (3) |
|---|---|---|---|---|
| 1st annular zone structure | 6 | −3 | 3 | 3 |

TABLE 22-continued

| | $\phi ie - \phi(i - 1)m$ | $\phi im - \phi ie$ | Condition (2) | Condition (3) |
|---|---|---|---|---|
| 2nd annular zone structure | 6 | −3 | 3 | 3 |
| 3rd annular zone structure | 6 | −3 | 3 | 3 |
| 4th annular zone structure | 4 | −3 | 1 | 3 |
| 5th annular zone structure | 6 | 0 | 6 | 0 |

Returning to table 21, the phase shift structure of the outer region 20ao includes a plurality of annular zones. Each annular zone is formed so as to give the additional optical path length to the second laser beam by one wavelength.

Table 23 shows an optical path difference function coefficients $P_2, \ldots$ defined when the phase shift structure provided on the first surface 20a of the objective lens 20 is construed as a diffracting structure. The diffracting order number m is shown in table 24. As shown in table 24, the inner region 20ai is provided with the diffracting structure that allows serving to converge the first laser beam and the second laser beam. On the other hand, the outer region 20ao is provided with the diffracting structure that allows to converge only the second laser beam, in other words the diffracting structure that limits the aperture of the first laser beam, which has a smaller effective beam diameter on the input surface.

TABLE 23

| | P2 | P4 | P6 | P8 | P10 | P12 |
|---|---|---|---|---|---|---|
| 1(h ≦ 2.015) | 0.0000E+00 | 6.6960E−01 | 6.5100E−02 | 1.0730E−02 | 0.0000E+00 | 0.0000E+00 |
| 1(2.015 < h) | 0.0000E+00 | −1.8800E+00 | 7.7780E−01 | 0.0000E+00 | 0.0000E+00 | 0.0000E+00 |

TABLE 24

| | inner region | outer region |
|---|---|---|
| $1^{st}$ laser beam | $2^{nd}$ order | $1^{st}$ order |
| $2^{nd}$ laser beam | — | $1^{st}$ order |

Figure 10A:
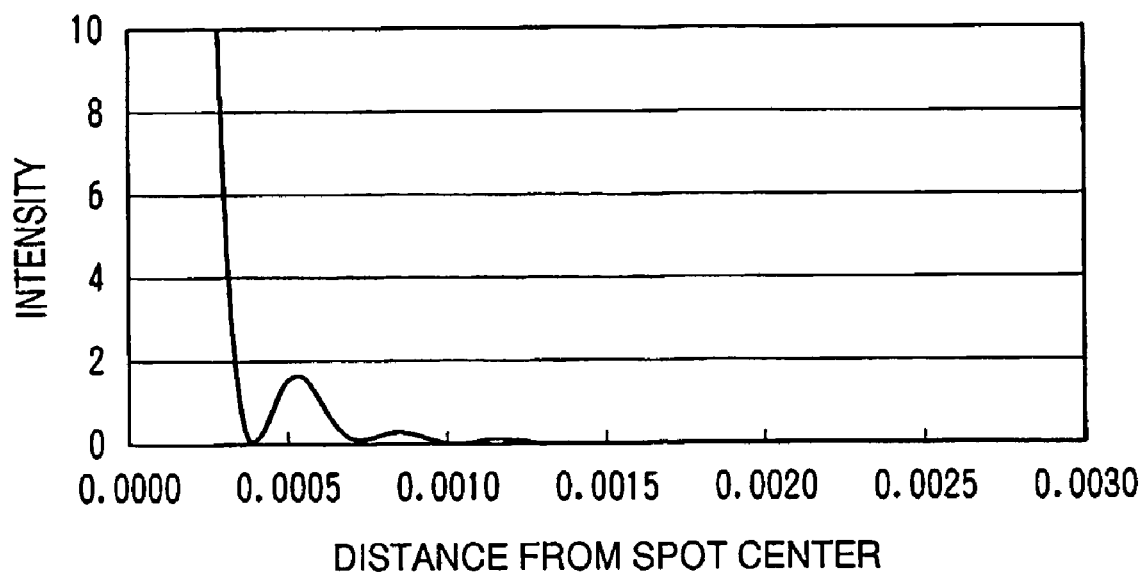
FIG. 10A is a line graph showing a relation between an intensity of a spot formed on the recording surface of a first optical disc by a first laser beam shifted by +5 nm from the design wavelength, and a distance from the center of the spot, in the device according to a third example.
Figure 10B:
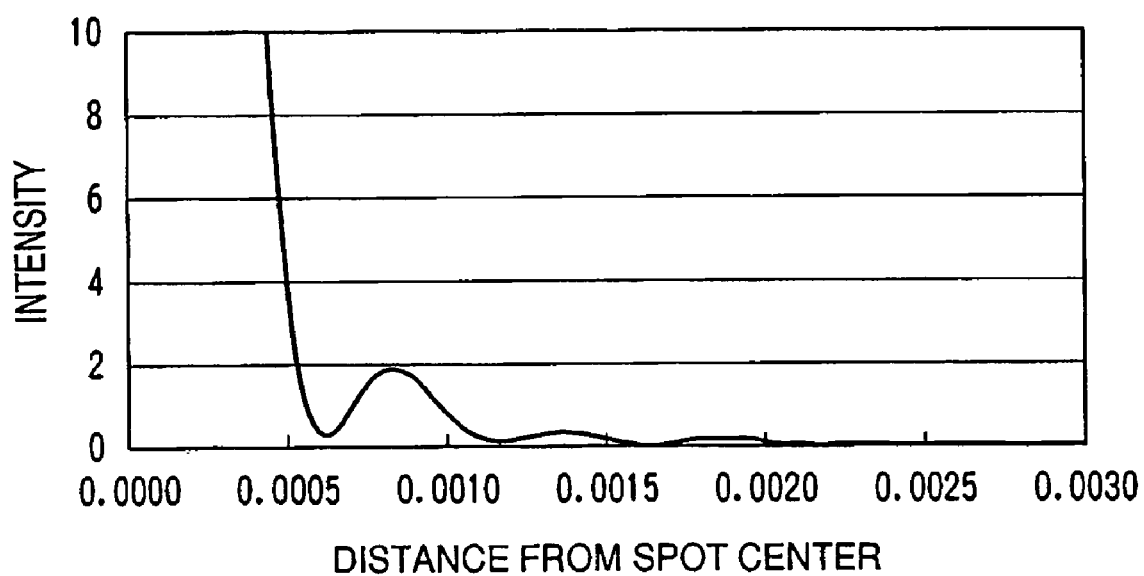
FIG. 10B is a line graph showing a relation between an intensity of a spot formed on the recording surface of a second optical disc by a second laser beam of the design wavelength, and a distance from the center of the spot, in the device according to the third example.
Figure 11A:
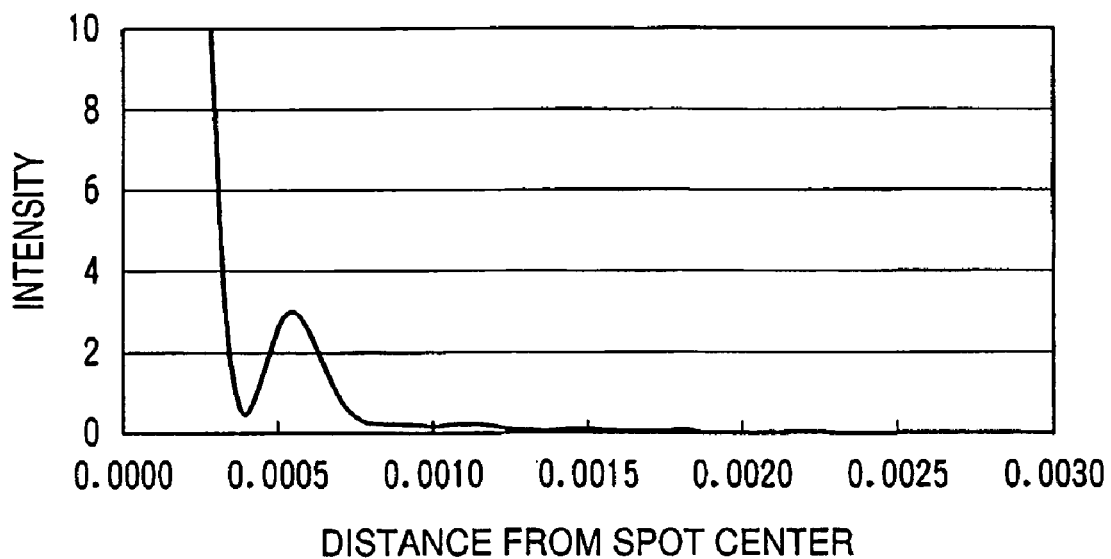
FIG. 11A is a line graph showing a relation between an intensity of a spot formed on the recording surface of a first optical disc by a first laser beam shifted by +5 nm from the design wavelength, and a distance from the center of the spot, in the device according to a third comparative example.
Figure 11B:
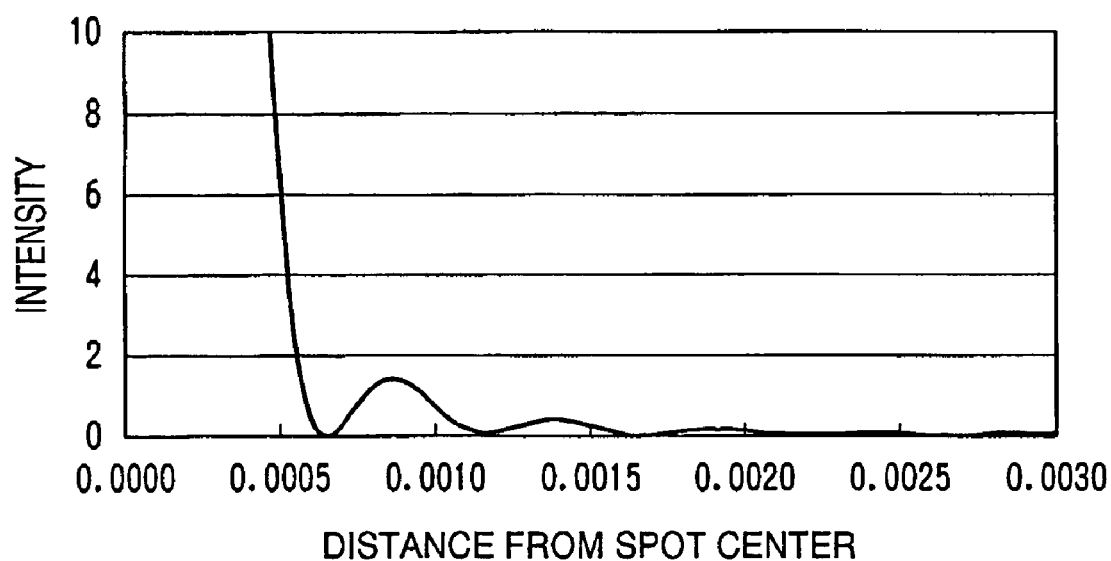
FIG. 11B is a line graph showing a relation between an intensity of a spot formed on the recording surface of a second optical disc by a second laser beam of the design wavelength, and a distance from the center of the spot, in the device according to the third comparative example.

FIG. 10A is a line graph showing a relation between an intensity of a spot formed on the recording surface of the first optical disc D1 by the first laser beam shifted by +5 nm from the design wavelength, and a distance from the center of the spot, in the optical pickup device 200 according to the third example. FIG. 10B is a line graph showing a relation between an intensity of a spot formed on the recording surface of the second optical disc D2 by the second laser beam of the design wavelength, and a distance from the center of the spot, in the optical pickup device 200 according to the third example. FIG. 11A is a line graph showing a relation between an intensity of a spot formed on the recording surface of the first optical disc D1 by the first laser beam shifted by +5 nm from the design wavelength, and a distance from the center of the spot, in a conventional optical pickup device (hereinafter, "optical pickup device according to third comparative example") having the same configuration as the third example except for not including the return step portion, in other words including only the annular zone group. FIG. 11B is a line graph showing a relation between an intensity of a spot formed on the recording surface of the second optical disc D2, by the second laser beam of the design wavelength, and a distance from the center of the spot, in the optical pickup device according to the third comparative example.

Through comparison between FIGS. 10A and 11A, it is understood that the optical pickup device 200 of the third example more effectively reduces the intensity of so called a sidelobe emerging around the spot, thereby increasing the intensity at a central portion of the spot, which largely contributes in recording or reproducing the information. Here, in an optical information recording and reproducing apparatus for exclusive use with the first optical disc, having the same configuration as the third example except for including the objective lens generally free from the aberration when using the first optical disc, the spot diameter to be formed by the first laser beam of the design wavelength on the recording surface of the first optical disc D1 is 0.521 (μm). The spot diameter shown in FIG. 11A is 0.534 (μm), while the spot diameter shown in FIG. 10A is 0.530 (μm), which is closer to the optimal spot diameter. Also, when the diffraction efficiency in the case of converging the first laser beam of the design wavelength on the recording surface of the first optical disc D1 without aberration is regarded as 100%, the diffraction efficiency of the spot shown in FIG. 11A is 82.0%, while that of the spot shown in FIG. 10A is 95.6%, which shows significant improvement.

Through comparison between FIGS. 10B and 11B, it is understood that the optical pickup device 200 of the third example and the optical pickup device of the third comparative example create the beam spots similar to each other in shape and intensity, including the sidelobe. Here, in an optical information recording and reproducing apparatus for exclusive use with the second optical disc, having the same configuration as the third example except for including the objective lens generally free from the aberration when using the second optical disc, the spot diameter to be formed by the second laser beam of the design wavelength on the recording surface of the second optical disc D2 is 0.851 (μm). The spot diameter shown in FIG. 11B is 0.861 (μm), while that of FIG. 8B is 0.853 (μm), which is generally the same as the spot formed by a beam of the design wavelength. Also, when the diffraction efficiency in the case of converging the second laser beam of the design wavelength on the recording surface of the second optical disc D2 without aberration is regarded as 100%, the diffraction efficiency of the spot shown in FIG. 11B is 87.7%, while that of the spot shown in FIG. 10B is 86.9%, which is well within a practically acceptable range, though slightly lower than the second comparative example.

The foregoing comparison proves that the optical pickup device 200 according to the third example can more effectively suppress the fluctuation of the spherical aberration arising from a minute shift of the wavelength when utilizing the first optical disc D1, than the device of the third comparative example, and form a beam spot with a greater light amount in a most appropriate diameter, on the recording surface of the first optical disc D1. It has also been proven that the optical pickup device 200 of the third example can still form the beam spot on the recording surface of the second optical disc D2 in generally similar conditions to the device of the third comparative example, while achieving the foregoing benefits with the first optical disc D1. Consequently, the optical pickup device 200 according to the third example can perform, while assuring high-precision recording or reproduction of information on the second optical disc i.e. the existing optical disc, high-precision recording or reproduction of information, regardless of the fluctuation of the wavelength, on the first optical disc D1 which, just because of the higher recording density, imposes a more rigorous tolerance against aberration.

Although the examples according to the present invention have thus been described, it is to be understood that the foregoing embodiment and examples are only exemplarily provided, and that the present invention is not limited to the specific numerical configurations adopted in the foregoing examples. For instance, the phase shift structure may be provided on the second surface of the phase shift element or the objective lens, instead of the first surface. Alternatively, the diffracting structure may be provided on both of the first surface and the second surface.

Further, FIG. 3 shows a plurality of annular zone structures. Likewise, the inner region 11ai, 20ai includes a plurality of annular zone structures, according to the examples. According to the present invention, however, the fluctuation of aberration originating from a minute shift of the wavelength can be restrained, if the phase shift structure provided on the inner region of the phase shift element and the objective lens of the optical system includes at least one annular zone structure. Therefore, it is not imperatively necessary to provide a plurality of annular zone structures.

This application claims priority of Japanese Patent Application No. 2005-036315, filed on Feb. 14, 2005. The entire subject matter of the application is incorporated herein by reference.

What is claimed is:

1. An optical system of an optical pick-up that utilizes a first laser beam and a second laser beam different in wavelength, respectively for at least two types of optical discs according to different standards, so as to record information to and/or reproduce information from the respective optical discs, comprising:

an objective lens; and an optical element including at least a phase shift surface among the surfaces thereof, and located closer to a light source than the objective lens;

wherein:

$$t1 \leq t2$$

is satisfied, where t1 represents a thickness of a cover layer of a first optical disc for which the first laser beam is employed for recording or reproducing the information, and t2 a thickness of a cover layer of a second optical disc for which the second laser beam, having a longer wavelength than the first laser beam, is employed for recording or reproducing the information;

$$NA1 \geq NA2$$

is satisfied, where NA1 represents a numerical aperture of the objective lens necessary for recording or reproducing the information on the first optical disc, and NA 2 the numerical aperture necessary for recording or reproducing the information on the second optical disc;

the phase shift surface includes a first region that converges the first laser beam on a recording surface of the first optical disc, and the second laser beam on a recording surface of the second optical disc, after the laser beams are transmitted through the optical element and the objective lens;

the first region includes at least an annular zone structure having an annular zone group including steps each of which gives an additional optical path length to the first laser beam generally by two wavelengths, with respect to an inner refracting surface at a boundary between adjacent refracting surfaces, and a return step portion located at an outer position of the annular zone group; and the return step includes a step that gives an additional optical path length to the first laser beam by three wavelengths with respect to an inner refracting surface located inside of the return step, in an opposite direction to the step of the annular zone group.

2. The optical system according to claim 1, wherein:

an effective beam diameter of the first laser beam on the input surface of the optical element, provided for obtaining a desired spot diameter on the recording surface of the first optical disc, is larger than an effective beam diameter of the second laser beam on the input surface of the optical element, provided for obtaining a desired spot diameter on the recording surface of the second optical disc;

the phase shift surface includes a second region provided at an outer location of the first region, so as to serve to converge the first laser beam transmitted through the optical element and the objective lens, but not the second laser beam transmitted through the optical element and the objective lens; and the second region includes a step that defines a different additional optical path length for the first laser beam from that of the first region, with respect to the inner refracting surface at a boundary between adjacent refracting surfaces.

3. The optical system according to claim 2, wherein the additional optical path length for the first laser beam is one wavelength, or minus one wavelength, in the second region.

4. The optical system according to claim 1, wherein:

an effective beam diameter of the second laser beam on the input surface of the optical element, provided for obtaining a desired spot diameter on the recording surface of the second optical disc, is larger than an effective beam diameter of the first laser beam on the input surface of the optical element, provided for obtaining a desired spot diameter on the recording surface of the first optical disc;

the phase shift surface may include a second region provided at an outer location of the first region, so as to serve to converge the second laser beam transmitted through the optical element and the objective lens, but not the first laser beam transmitted through the optical element and the objective lens; and the second region includes a step that defines a different additional optical path length for the second laser beam from that of the first region, with respect to the inner refracting surface at a boundary between adjacent refracting surfaces.

5. The optical system according to claim 4, wherein the step in the second region is formed so as to give an additional optical path length to the second laser beam by one wavelength, or minus one wavelength.

6. The optical system according to claim 1, wherein the objective lens and the optical element are held by a same holder.

7. An optical pick-up that utilizes a first laser beam and a second laser beam different in wavelength, respectively for at least two types of optical discs according to different standards, so as to record and/or reproduce information, comprising:

the optical system according to claim 1; and a light source that emits the first laser beam and the second laser beam;

wherein the following formula (1) is satisfied:

$$0.55 < (\lambda 1/(n1-1))/(\lambda 2/(n2-1)) < 0.65 \qquad (1)$$

where $\lambda 1$ represents the wavelength of the first laser beam, $\lambda 2$ the wavelength of the second laser beam, n1 a refractive index of the optical element with respect to the wavelength $\lambda 1$, and n2 a refractive index of the optical element with respect to the wavelength $\lambda 2$.

8. An objective lens, for use in an optical pick-up that utilizes a first laser beam and a second laser beam different in wavelength, respectively for at least two types of optical discs according to different standards, so as to record information to and/or reproduce information from the respective optical discs, comprising:

a phase shift structure at least on one of the surfaces thereof, wherein:

$$t1 \leq t2$$

is satisfied, where t1 represents a thickness of a cover layer of a first optical disc for which the first laser beam is employed for recording or reproducing the information, and t2 a thickness of a cover layer of a second optical disc for which the second laser beam, having a longer wavelength than the first laser beam, is employed for recording or reproducing the information;

NA1≧NA2 is satisfied, where NA1 represents a numerical aperture of the objective lens necessary for recording or reproducing the information on the first optical disc, and NA 2 the numerical aperture necessary for recording or reproducing the information on the second optical disc;

the phase shift structure includes a first region that converges the first laser beam on a recording surface of the first optical disc, and the second laser beam on a recording surface of the second optical disc; and the first region includes at least an annular zone structure having an annular zone group including a step that gives an additional optical path length to the first laser beam by two wavelengths, and a return step portion located at an outer position of the annular zone group; and the return step includes a step that gives an additional optical path length to the first laser beam by three wavelengths with respect to an inner refracting surface located inside of the return step, in an opposite direction to the step of the annular zone group.

9. The objective lens according to claim 8, wherein:

an effective beam diameter of the first laser beam on the input surface of the objective lens is larger than an effective beam diameter of the second laser beam on the input surface of the objective lens;

the phase shift structure includes a second region provided at an outer location of the first region, so as to serve to converge the first laser beam but not the second laser beam; and the second region includes a step that defines a different additional optical path length for the first laser beam from that of the first region, with respect to the inner refracting surface at a boundary between adjacent refracting surfaces.

10. The objective lens according to claim 9, wherein the additional optical path length for the first laser beam is one wavelength, or minus one wavelength, in the second region.

11. The objective lens according to claim 8, wherein:

an effective beam diameter of the second laser beam on the input surface of the objective lens is larger than an effective beam diameter of the first laser beam on the input surface of the objective lens;

the phase shift structure includes a second region provided at an outer location of the first region, so as to serve to converge the second laser beam but not the first laser beam; and the second region includes a step that defines a different additional optical path length for the second laser beam from that of the first region, with respect to the inner refracting surface at a boundary between adjacent refracting surfaces.

12. The objective lens according to claim 11, wherein the additional optical path length for the second laser beam is one wavelength, or minus one wavelength, in the second region of the phase shift structure.

13. An optical pick-up that utilizes a first laser beam and a second laser beam different in wavelength, respectively for at least two types of optical discs according to different standards, so as to record information to and/or reproduce information from the respective optical discs, comprising:

the objective lens according to claim 8; and a light source that emits the first laser beam and the second laser beam;

wherein the following formula (1) is satisfied:

$$0.55 < (\lambda 1/(n1-1))/(\lambda 2/(n2-1)) < 0.65 \quad (1)$$

where $\lambda 1$ represents the wavelength of the first laser beam, $\lambda 2$ the wavelength of the second laser beam, n1 a refractive index of the objective lens with respect to the wavelength $\lambda 1$, and n2 a refractive index of the objective lens with respect to the wavelength $\lambda 2$.

14. An optical system of an optical pick-up that utilizes a first laser beam and a second laser beam different in wavelength, respectively for at least two types of optical discs according to different standards, so as to record information to and/or reproduce information from the respective optical discs, comprising:

an objective lens; and an optical element including at least a phase shift surface among the surfaces thereof, and located closer to a light source than the objective lens, wherein:

t1≦t2 is satisfied, where t1 represents a thickness of a cover layer of a first optical disc for which the first laser beam is employed for recording or reproducing the information, and t2 a thickness of a cover layer of a second optical disc for which the second laser beam, having a longer wavelength than the first laser beam, is employed for recording or reproducing the information;

NA1≧NA2 is satisfied, where NA1 represents a numerical aperture of the objective lens necessary for recording or reproducing the information on the first optical disc, and NA 2 the numerical aperture necessary for recording or reproducing the information on the second optical disc;

the phase shift surface includes a first region that converges the first laser beam on a recording surface of the first optical disc, and the second laser beam on a recording surface of the second optical disc, after transmission through the optical element and the objective lens;

the first region includes at least an annular zone structure having an annular zone group including a step that shifts a phase of the respective laser beams incident thereupon in a first direction, and a return step portion including a step that shifts a phase of the respective laser beams incident thereupon in a second direction opposite to the first direction; and the following condition (2) is satisfied:

$$1 \leq |\phi ie - \phi(i-1)m| - |\phi im - \phi ie| < 4 \quad (2)$$

$\phi(i-1)=0$, when i=1 where $\phi ie$ (unit:$\lambda$) represents an additional optical path length for the first laser beam with respect to an annular zone located at the vicinity of an optical axis of the optical system, in an outermost annular zone in an i-th annular zone group at the i-th position from the optical axis, and $\phi im$ (unit:$\lambda$) an additional optical path length for the first laser beam with respect to the annular zone located at the vicinity of the optical axis, in an i-th return step portion at the i-th position from the optical axis.

15. The optical system according to claim 14, wherein the following condition (3) is further satisfied:

$$2.7 < |\phi im - \phi ie| < 3.3 \quad (3).$$

16. An optical pick-up that utilizes a first laser beam and a second laser beam different in wavelength, respectively for at least two types of optical discs according to different standards, so as to record information to and/or reproduce information from the respective optical discs, comprising:

the optical pickup system according to claim 14; and
a light source that emits the first laser beam and the second laser beam;
wherein the following formula (1) is satisfied:

$$0.55 < (\lambda 1/(n1-1))/(\lambda 2/(n2-1)) < 0.65 \quad (1)$$

where $\lambda 1$ represents the wavelength of the first laser beam, $\lambda 2$ the wavelength of the second laser beam, n1 a refractive index of the optical element with respect to the wavelength $\lambda 1$, n2 a refractive index of the optical element with respect to the wavelength $\lambda 2$.

17. An objective lens, incorporated in an optical pick-up that utilizes a first laser beam and a second laser beam different in wavelength, respectively for at least two types of optical discs according to different standards, so as to record information to and/or reproduce information from the respective optical discs, comprising:

a phase shift structure at least on one of the surfaces thereof,
wherein:

$$t1 \leq t2$$

is satisfied, where t1 represents a thickness of a cover layer of a first optical disc for which the first laser beam is employed for recording or reproducing the information, and t2 a thickness of a cover layer of a second optical disc for which the second laser beam, having a longer wavelength than the first laser beam, is employed for recording or reproducing the information;

$$NA1 \geq NA2$$

is satisfied, where NA1 represents a numerical aperture of the objective lens necessary for recording or reproducing the information on the first optical disc, and NA 2 the numerical aperture necessary for recording or reproducing the information on the second optical disc;

the phase shift structure includes a first region that converges the first laser beam on a recording surface of the first optical disc, and the second laser beam on a recording surface of the second optical disc;
the first region includes at least an annular zone structure having an annular zone group, including a step that shifts a phase of the respective laser beams incident thereupon in a first direction, and a return step portion that shifts a phase of the respective laser beams incident thereupon in a second direction opposite to the first direction; and
the following condition (2) is satisfied:

$$1 \leq |\phi ie - \phi(i-1)m| - |\phi im - \phi ie| < 4 \quad (2)$$

$$\phi(i-1) = 0, \text{ when } i = 1$$

where $\phi ie$ (unit:$\lambda$) represents an additional optical path length for the first laser beam with respect to an annular zone located at the vicinity of an optical axis of the objective lens, in an outermost annular zone in an ith annular zone group at the ith position from the optical axis, and $\phi im$ (unit:$\lambda$) an additional optical path length for the first laser beam with respect to the annular zone located at the vicinity of the optical axis, in an ith return step portion at the i-th position from the optical axis.

18. The objective lens according to claim 17, wherein the following condition (3) is further satisfied:

$$2.7 < |\phi im - \phi ie| < 3.3 \quad (3).$$

19. An optical pick-up that utilizes a first laser beam and a second laser beam different in wavelength, respectively for at least two types of optical discs according to different standards, so as to record information to and/or reproduce information from the respective optical discs, comprising:

the objective lens according to claim 17;
a light source that emits the respective beam;
wherein the following formula (1) is satisfied:

$$0.55 < (\lambda 1/(n1-1))/(\lambda 2/(n2-1)) < 0.65 \quad (1)$$

where $\lambda 1$ represents the wavelength of the first laser beam, $\lambda 2$ the wavelength of the second laser beam, n1 a refractive index of the objective lens with respect to the wavelength $\lambda 1$, n2 a refractive index of the objective lens with respect to the wavelength $\lambda 2$.

* * * * *